(12) United States Patent
Minami et al.

(10) Patent No.: US 12,297,589 B2
(45) Date of Patent: May 13, 2025

(54) WATER-REPELLENT SOFTENING AGENT

(71) Applicant: DAIKIN INDUSTRIES, LTD., Osaka (JP)

(72) Inventors: Shinichi Minami, Shanghai (CN); Takashi Enomoto, Osaka (JP); Teruaki Gotou, Osaka (JP); Ikuo Yamamoto, Osaka (JP); Tao Chen, Shanghai (CN)

(73) Assignee: DAIKIN INDUSTRIES, LTD., Osaka (JP)

( * ) Notice: Subject to any disclaimer, the term of this patent is extended or adjusted under 35 U.S.C. 154(b) by 830 days.

(21) Appl. No.: 17/387,031

(22) Filed: Jul. 28, 2021

(65) Prior Publication Data

US 2021/0355631 A1 Nov. 18, 2021

Related U.S. Application Data

(63) Continuation of application No. PCT/JP2019/047951, filed on Dec. 6, 2019.

(30) Foreign Application Priority Data

Jan. 30, 2019 (CN) .......................... 201910090503.5

(51) Int. Cl.
*D06N 3/12* (2006.01)
*D06N 3/00* (2006.01)
*D06N 3/04* (2006.01)

(52) U.S. Cl.
CPC ........... *D06N 3/128* (2013.01); *D06N 3/0059* (2013.01); *D06N 3/047* (2013.01); *D06N 2203/044* (2013.01); *D06N 2203/066* (2013.01); *D06N 2209/142* (2013.01); *D10B 2401/021* (2013.01)

(58) Field of Classification Search
CPC ...... D06N 3/128; D06N 3/0059; D06N 3/047; D06N 2203/044; D06N 2203/066; D06N 2209/142; D10B 2401/021; C08F 2/44; C08F 4/04; C08F 283/12; C08F 283/124; C08F 2/24; C08F 2/28; C08F 2/30; C08F 120/18; C08F 220/18; C08F 220/22; C08F 220/24; D06M 15/295; D06M 15/3566; D06M 15/3568; D06M 15/6436; D06M 2200/11; D06M 2200/12; D06M 2200/50; D06M 15/263; D06M 15/277; D06M 15/643; D06M 15/65; D06M 15/657; D06M 2101/06; D06M 2101/32; D06M 2101/34; C08G 77/14; C08G 77/20; C08L 83/04; C08L 83/06; C08L 83/10; C08L 33/14; C08L 33/08; C09K 3/18

See application file for complete search history.

(56) References Cited

U.S. PATENT DOCUMENTS

| 5,068,295 | A | 11/1991 | Misaizu et al. |
| 5,260,400 | A * | 11/1993 | Karydas ................. C08G 77/42 528/25 |
| 5,276,175 | A | 1/1994 | Dams et al. |
| 6,387,999 | B1 | 5/2002 | Dirschl et al. |
| 8,552,106 | B2 | 10/2013 | Yamamoto et al. |
| 2011/0124803 | A1 | 5/2011 | Yamamoto et al. |
| 2015/0147286 | A1 | 5/2015 | Barrera et al. |

FOREIGN PATENT DOCUMENTS

| CN | 101981248 A | 2/2011 |
| EP | 0 777 009 A2 | 6/1997 |
| EP | 3 460 021 A1 | 3/2019 |
| JP | 58-042682 A | 3/1983 |
| JP | 60-190408 A | 9/1985 |
| JP | 2-214791 A | 8/1990 |
| JP | 03-231986 A | 10/1991 |
| JP | 06-506239 A | 7/1994 |
| JP | 9-143877 A | 6/1997 |
| JP | 2001-146548 A | 5/2001 |
| JP | 2012-503029 A1 | 2/2012 |
| JP | 2015-531011 A | 10/2015 |
| JP | 2016-199712 A | 12/2016 |
| JP | 2017-218713 A | 12/2017 |
| JP | 2017-222967 A | 12/2017 |
| TW | 201835290 A | 10/2018 |
| WO | 2010/030046 A1 | 3/2010 |
| WO | 2014/190515 A1 | 12/2014 |

(Continued)

OTHER PUBLICATIONS

Siltech Corporation, "Technical Data Sheet, Silwax® D 222", 2009, 1 page total.
Nite-Chrip, "CAS73891-93-7", 1 page total, Chemical Risk Information Platform, National Institute of Technology and Evaluation (2016).
International Search Report for PCT/JP2019/047951 dated Mar. 3, 2020.
International Preliminary Report on Patentability dated Jul. 27, 2021 in International Application No. PCT/JP2019/047951.
Extended European Search Report dated Nov. 2, 2022, issued in European Application No. 19913524.5.

*Primary Examiner* — Andrew J. Oyer
(74) *Attorney, Agent, or Firm* — Sughrue Mion, PLLC

(57) ABSTRACT

A softening agent composition including (1) a silicone polymer, (2) a water-repellent polymer, (3) an emulsifier, and (4) a liquid medium that is water or a mixture of water and an organic solvent. Also disclosed is a method for producing the softening agent composition which includes producing a water-repellent polymer by polymerizing, in the presence of the silicone polymer, a monomer that constitutes the water-repellent polymer. The water-repellent polymer may be at least one selected from the group consisting of fluorine-containing polymers and non-fluorine-containing polymers. Also disclosed is a method for treating a substrate with the softening agent composition and a substrate treated with the softening agent composition.

20 Claims, No Drawings

(56) References Cited

FOREIGN PATENT DOCUMENTS

WO      2017/199726 A1    11/2017
WO      2018/054712 A1    3/2018

\* cited by examiner

WATER-REPELLENT SOFTENING AGENT

CROSS REFERENCE TO RELATED APPLICATIONS

This application is a Rule 53(b) Continuation of International Application No. PCT/JP2019/047951 filed Dec. 6, 2019, claiming priority based on Chinese Patent Application No. 201910090503.5 filed Jan. 30, 2019, the respective disclosures of which are incorporated herein by reference in their entirety.

TECHNICAL FIELD

The present disclosure relates to a softening agent imparting water repellency and softness to a substrate.

BACKGROUND ART

Conventionally, in order to simultaneously impart water- and oil-repellency as well as softness to substrates, such as fibers, compositions comprising compounds having perfluoroalkyl groups or long-chain alkyl groups imparting water repellency, and modified silicone compounds imparting softness have been widely used (for example, Patent Literature 1 (JP S58-42682 A), Patent Literature 2 (JP S60-190408 A), and Patent Literature 3 (JP H9-143877 A)). Moreover, for the same purpose, there has proposed a method of using a copolymer of a fluorine-containing acrylate and a silicone-containing monomer (for example, Patent Literature 4 (JP H02-214791 A) and Patent Literature 5 (JP H3-231986 A)).

Patent Literature 6 (JP H6-506239 A) discloses a composition comprising a fluorine-containing compound having a fluorochemical oligomer moiety, an organic moiety, and a bonding group.

Patent Literature 7 (JP 2001-146548 A) discloses a composition comprising a perfluoroalkyl group-containing ester and an oligo- or poly-urethane.

Patent Literature 8 (JP 2015-531011 A) discloses a composition comprising an additive and an organopolysiloxane conditioning agent.

CITATION LIST

Patent Literature

Patent Literature 1
  JP S58-42682 A
Patent Literature 2
  JP S60-190408 A
Patent Literature 3
  JP H9-143877 A
Patent Literature 4
  JP H02-214791 A
Patent Literature 5
  JP H3-231986 A
Patent Literature 6
  JP H6-506239 A
Patent Literature 7
  JP 2001-146548 A
Patent Literature 8
  JP 2015-531011 A

SUMMARY OF INVENTION

Technical Problem

In the conventional softening agents, the water-repellent performance is lowered when substrates, such as fibers are subjected to water-repellent treatment by using the softening agents combined with water-repellent agents. Furthermore, since a softening agent emulsion and a water repellent agent emulsion are prepared from different emulsification systems, the stability of the emulsions is low in general mixing.

An object of the present disclosure is to provide a softening agent composition which can impart favorable water repellency and softness during water repellent treatment.

Solution to Problem

The present disclosure relates to a softening agent composition, comprising
  (1) a silicone polymer,
  (2) a water-repellent polymer,
  (3) an emulsifier, and
  (4) a liquid medium which is water or a mixture of water and an organic solvent.

The water-repellent polymer is preferably produced by polymerizing a monomer constituting the water-repellent polymer in the presence of the silicone polymer. The water-repellent polymer is preferably one selected from the group consisting of a fluorine-containing polymer and a fluorine-free polymer.

The preferred aspects of the present invention are as follows.

Aspect 1.
  A softening agent composition, comprising
  (1) a silicone polymer,
  (2) at least one water-repellent polymer which is polymerized in the presence of the silicone polymer, and selected from the group consisting of a fluorine-containing polymer and a fluorine-free polymer,
  (3) a liquid medium which is water or a mixture of water and an organic solvent, and
  (4) an emulsifier,
  wherein the amount of the silicone polymer is 20% by weight or more, based on the total amount of the silicone polymer and the water-repellent polymer.

Aspect 2.
  The softening agent composition according to aspect 1, wherein the silicone polymer (1) is a polymer represented by the formula:

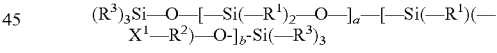

wherein $R^1$ each is independently a hydrogen atom, an alkyl group having 1 to 20 carbon atoms, an aryl group having 6 to 20 carbon atoms, or an alkoxy group having 1 to 4 carbon atoms,
  $R^2$ each is independently a functional group,
  $R^3$ each is independently a hydrogen atom, an alkyl group having 1 to 20 carbon atoms, an aryl group having 6 to 20 carbon atoms, an alkoxy group having 1 to 4 carbon atoms, or a functional group,
  $X^1$ each is a direct bond or a divalent hydrocarbon group having 1 to 10 carbon atoms,
  a is an integer of 0 or larger, b is an integer of 0 or larger, and (a+b) is 5 to 200, and
  wherein the functional group is at least one functional group selected from the group consisting of an epoxy group, an amino group, a vinyl group, a (meth)acrylamide group, a (meth)acrylate group and a hydrocarbon group having 7 to 40 carbon atoms.

Aspect 3.
  The softening agent composition according to aspect 1 or 2, wherein the fluorine-containing polymer is a fluorine-containing polymer having a repeating unit derived from a fluorine-containing monomer represented by the formula:

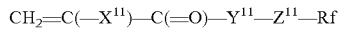

wherein $X^{11}$ is a hydrogen atom, a linear or branched alkyl group having 1 to 21 carbon atoms, a fluorine atom, a chlorine atom, a bromine atom, an iodine atom, and a $CFX^1X^2$ group ($X^1$ and $X^2$ are a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group, and a substituted or unsubstituted phenyl group;

$Y^{11}$ is —O— or —NH—;

$Z^{11}$ is a direct bond, a linear or branched aliphatic group having 1 to 20 carbon atoms, an aromatic group or cycloaliphatic group having 6 to 30 carbon atoms, a group represented by the formula: —$R^2(R^1)N$—$SO_2$— or the formula: —$R^2(R^1)N$—CO—, wherein $R^1$ is an alkyl group having 1 to 10 carbon atoms, and $R^2$ is a linear alkylene group or branched alkylene group having 1 to 10 carbon atoms, a group represented by the formula: —$CH_2CH(OR^3)$—$CH_2$—(Ar—O)$_p$—, wherein $R^3$ is a hydrogen atom or an acyl group having 1 to 10 carbon atoms, Ar is an arylene group optionally having a substituent, and p represents 0 or 1, a group represented by the formula: —$CH_2$—Ar—(O)$_q$—, wherein Ar is an arylene group optionally having a substituent, and q is 0 or 1, or a —$(CH_2)$, —$SO_2$—$(CH_2)_n$— group or —$(CH_2)$, —S—$(CH_2)_n$— group, wherein m is 1 to 10 and n is 0 to 10; and Rf is a linear or branched fluoroalkyl group having 1 to 20 carbon atoms, and the fluorine-free polymer is a fluorine-free polymer having a repeating unit derived from a long-chain (meth)acrylic monomer represented by the formula:

$$CH_2=C(-X^{21})-C(=O)-Y^{21}-(R^{21})_k \quad (a1)$$

wherein $R^{21}$ is a hydrocarbon group having 7 to 40 carbon atoms, $X^{21}$ is a hydrogen atom, a methyl group or a halogen atom, $Y^{21}$ is a group (excluding a hydrocarbon group) composed of at least one group selected from the group consisting of a divalent to tetravalent hydrocarbon group having 1 carbon atom (particularly —$CH_2$— or —CH=), —$C_6H_4$—, —O—, —C(=O)—, —S(=O)$_2$— and —NH—, and k is 1 to 3.

Aspect 4.

The softening agent composition according to aspect 3, wherein in the fluorine-containing monomer, $X^{11}$ is a hydrogen atom, a methyl group or a chlorine atom, and Rf has 1 to 6 carbon atoms.

Aspect 5.

The softening agent composition according to aspect 3, wherein in the long-chain (meth)acrylic monomer, $Y^{21}$ is —O—, —NH—, —O—C(=O)—, —C(=O)—NH—, —NH—C(=O)—, —O—C(=O)—NH—, —NH—C(=O)—O—, —NH—C(=O)—NH—, —O—$C_6H_4$—, —O—$(CH_2)_m$—O—, —NH—$(CH_2)_m$—NH—, —O—$(CH_2)_m$—NH—, —NH—$(CH_2)_m$—O—, —O—$(CH_2)_m$—O—C(=O)—, —O—$(CH_2)_m$—C(=O)—O—, —NH— $(CH_2)_m$—O—C(=O)—, —NH—$(CH_2)_m$—C(=O)—O—, —O—$(CH_2)_m$—O—C(=O)—NH—, —O—$(CH_2)_m$—NH—C(=O)—O—, —O—$(CH_2)_m$—C(=O)—NH—, —O—$(CH_2)_m$—NH—C(=O)—, —O—$(CH_2)_m$—NH—C(=O)—, —O—$(CH_2)_m$—NH—C(=O)—NH—, —O—$(CH_2)_m$—NH—C(=O)—NH—, —O—$(CH_2)_m$—O—$C_6H_4$—, —O—$(CH_2)_m$—NH—S(=O)$_2$—, —O—$(CH_2)_m$—S(=O)$_2$—NH—, —NH—$(CH_2)_m$—O—C(=O)—NH—, —NH—$(CH_2)_m$—NH—C(=O)—O—, —NH—$(CH_2)_m$—C(=O)—NH—, —NH—$(CH_2)_m$—NH—C(=O)—, —NH—$(CH_2)_m$—NH—C(=O)—NH—, —NH—$(CH_2)_m$—O—$C_6H_4$—, —NH—$(CH_2)_m$—NH—$C_6H_4$—, —NH—$(CH_2)_m$—NH—S(=O)$_2$—, or —NH—$(CH_2)_m$—S(=O)$_2$—NH—, wherein m is 1 to 5.

Aspect 6.

The softening agent composition according to any one of aspects 1 to 5, wherein an amount of the silicone polymer (1) is 30 to 90% by weight, based on a total weight of the silicone polymer (1) and the water-repellent polymer (2), the amount of the liquid medium (3) is 5 to 99.9% by weight, based on the softening agent composition, and an amount of the emulsifier (4) is 0.1 to 20 parts by weight, based on 100 parts by weight of the total amount of the silicone polymer (1) and the water-repellent polymer (2).

Aspect 7.

The softening agent composition according to aspect 1 or 2, wherein the water-repellent polymer (2) further comprises a repeating unit formed from a fluorine-free non-crosslinkable monomer and/or a fluorine-free crosslinkable monomer.

Aspect 8

The softening agent composition according to aspect 7, wherein the fluorine-free non-crosslinkable monomer is, in the fluorine-containing polymer, a long-chain (meth) acrylic monomer represented by the formula:

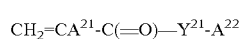

wherein $A^{21}$ is a hydrogen atom or a methyl group, $A^{22}$ is a linear or branched aliphatic hydrocarbon group having 7 to 40 carbon atoms, and $Y^{21}$ is —O— or —NH—, or in the fluorine-containing polymer or the fluorine-free polymer, a cyclic hydrocarbon group-containing (meth) acrylic monomer represented by the formula:

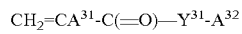

wherein $A^{31}$ is a hydrogen atom or a methyl group, $A^{32}$ is a cyclic hydrocarbon group having 4 to 20 carbon atoms, and $Y^{31}$ is —O— or —NH—.

Aspect 9.

The softening agent composition according to aspect 7, wherein the fluorine-free crosslinkable monomer is a compound having at least two ethylenically unsaturated double bonds, or a compound having at least one ethylenically unsaturated double bond and at least one reactive group, and the reactive group is at least one selected from the group consisting of a hydroxyl group, an epoxy group, a chloromethyl group, a blocked isocyanate group, an amino group and a carboxyl group.

Aspect 10.

The softening agent composition according to any one of aspects 7 to 9, wherein in the water-repellent polymer (2), the total amount of the fluorine-containing monomer and a long-chain hydrocarbon group-containing fluorine-free monomer is 32 to 98% by weight, based on the water-repellent polymer, the amount of the fluorine-free non-crosslinkable monomer is 2 to 68% by weight, based on the water-repellent polymer, and the amount of the fluorine-free crosslinkable monomer is 0.1 to 20 parts by weight, based on 100 parts by weight of the total amount of the fluorine-containing monomer and the long-chain hydrocarbon group-containing fluorine-free monomer.

Aspect 11.

A method for producing the softening agent composition according to any one of aspects 1 to 10, comprising producing a water-repellent polymer (2) by polymerizing a monomer constituting the water-repellent polymer (2) in the presence of a silicone polymer (1), and obtaining the softening agent composition.

Aspect 12.

A method for treating a substrate, comprising treatment with the softening agent composition according to any one of aspects 1 to 10.

Aspect 13.

A substrate treated with the softening agent composition according to any one of aspects 1 to 10.

Advantageous Effects of Invention

According to the present disclosure, the softening agent composition can impart favorable softness without lowering the water repellency regardless of the fluorine-containing polymer and the fluorine-free polymer.

The softening agent composition can also impart favorable softness without lowering the water repellency as in the conventional softening agent emulsion using a large amount of emulsifier. Favorable water repellency and oil repellency can be efficiently imparted together with favorable softness. The softening agent composition has high emulsion stability.

DESCRIPTION OF EMBODIMENTS

A softening agent composition comprises:
(1) a silicone polymer,
(2) a water-repellent polymer,
(3) an emulsifier (surfactant), and
(4) a liquid medium which is water or a mixture of water and an organic solvent. In the softening agent composition, the silicone polymer (1) and the water-repellent polymer (2) act as active ingredients.

(1) Silicone Polymer

The silicone polymer is a component which imparts mainly softness. Generally, the silicone polymer is a linear polymer having a siloxane bond.

The silicone polymer preferably has no mercapto group. In general, silicone polymers do not react with monomers which constitute water-repellent polymers.

The silicone polymer may have no functional group, but preferably has at least one functional group. Examples of the functional group include an epoxy group, an amino group, a vinyl group, a (meth)acrylamide group, a (meth)acrylate group, and a long-chain hydrocarbon group.

The silicone polymer is preferably a polymer represented by the formula:

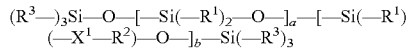
$(-X^1-R^2)-O-]_b-Si(-R^3)_3$ wherein $R^1$ each is independently a hydrogen atom, an alkyl group having 1 to 20 carbon atoms, an aryl group having 6 to 20 carbon atoms, or an alkoxy group having 1 to 4 carbon atoms, $R^2$ each is independently a functional group, $R^3$ each is independently a hydrogen atom, an alkyl group having 1 to 20 carbon atoms, an aryl group having 6 to 20 carbon atoms, an alkoxy group or functional group having 1 to 4 carbon atoms, $X^1$ each is a direct bond or a divalent hydrocarbon group having 1 to 10 carbon atoms, a is an integer of 0 or more, b is an integer of 0 or more, and (a+b) is 5 to 200.

In $R^1$ and $R^3$, the alkyl group having 1 to 20 carbon atoms and the aryl group having 6 to 20 carbon atoms may be unsubstituted or substituted.

Specific examples of $R^1$ and $R^3$ include a methyl group, an ethyl group, a propyl group, a butyl group, a pentyl group, a hexyl group, a heptyl group, an octyl group, a nonyl group, a decyl group, a dodecyl group, a tetradecyl group, a hexadecyl group, an octadecyl group; a cyclopentyl group, a cyclohexyl group, a cycloheptyl group; a phenyl group, a tolyl group, a naphthyl group, or a group in which a part or all of hydrogen atoms bonded to these groups are substituted with a halogen atom, an amino group, or a cyano group. $R^1$ and $R^3$ are preferably a methyl group or an ethyl group.

$R^1$ and $R^3$ each may have an alkyl group having 3 to 22 carbon atoms or an unsaturated hydrocarbon group having 8 to 40 carbon atoms (for example, a hydrocarbon group having an aromatic ring), but they do not preferably have these groups.

In $R^1$ and $R^3$, the alkoxy group having 1 to 4 carbon atoms may be linear or branched. Examples of the alkoxy group having 1 to 4 carbon atoms include a methoxy group, an ethoxy group, a propoxy group, and a butoxy group.

In terms of facilitation of industrial manufacturing and availability, $R^1$ and $R^3$ are preferably a hydrogen atom or a methyl group, more preferably a methyl group.

$R^2$ is a functional group.

In $R^2$ and $R^3$, the functional group is preferably an epoxy group, an amino group (e.g., a monoamino group or a diamino group), a vinyl group, a (meth)acrylamide group, a (meth)acrylate group, and a long-chain hydrocarbon group.

The long-chain hydrocarbon group is preferably a saturated hydrocarbon group having 7 to 40 carbon atoms, for example, 12 to 40 carbon atoms, particularly 23 to 40 carbon atoms. The long-chain hydrocarbon group may be linear or branched, preferably an alkyl group. Specific examples of the long-chain hydrocarbon group include a lauryl group (12 carbon atoms), a stearyl group (18 carbon atoms), a tricosyl group (23 carbon atoms), a lignoceryl group (tetracosyl group, 24 carbon atoms), a cellotyl group (hexacosyl group, 26 carbon atoms), a montyl group (octacosyl group, 28 carbon atoms), a melisyl group (triacontane group, 30 carbon atoms), and a dotriacontane group (32 carbon atoms).

$X^1$ is a direct bond or a divalent hydrocarbon group having 1 to 10 carbon atoms. The hydrocarbon group having 1 to 10 carbon atoms is preferably an alkylene group, particularly $-(CH_2)_n-$ (n is an integer of 1 to 10, for example, an integer of 1 to 5).

The subscript a is an integer of 0 or larger. In terms of facilitation of industrial manufacturing and availability, a is preferably 40 or less and more preferably 30 or less.

The subscript b is an integer of 0 or larger, preferably 1 or larger. In terms of facilitation of industrial manufacturing and availability as well as facilitation of handleability, b is preferably 40 or less.

The sum of a and b is 5 to 200. In terms of facilitation of industrial manufacturing and availability as well as facilitation of handleability, the sum of a and b is preferably 10 to 100, preferably 30 to 80, and particularly 40 to 60. The subscript a may be 0 to 150, for example 1 to 100. The lower limit of b may be 0, 1, 2, or 3, and the upper limit of b may be 150, 10, or 5.

Each of multiplicatively present $R^1$, $R^2$, $R^3$, and X' groups may be the same or different.

50 mol % or more of the $R^1$, $R^2$ and $R^3$ groups in total is preferably a methyl group.

The occurrence order of the repeating units with parentheses accompanied by the subscript a or b is not limited to the occurrence order indicated by the chemical formula, and is arbitrary. Accordingly, the silicone polymer may be a random polymer or a block polymer.

Specific examples of a silicone polymer having no functional group are dimethyl silicone and methyl phenyl silicone.

The silicone polymer preferably has a functional group. Specific examples of the silicone polymer having a functional group are as follows:

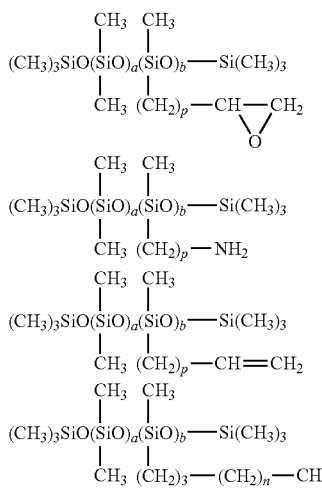

wherein a represents an integer of 0 to 150,
b represents an integer of 1 to 150,
(a+b) is 5 to 200,
p is an integer of 0 to 5, and
n is an integer of 3 to 36, particularly 19 to 36.

The silicone polymer can be synthesized by a conventionally publicly known method. For example, a silicone polymer having the long-chain hydrocarbon group can be obtained, for example, by hydrosilylation reaction of an α-olefin (long-chain α-olefin) with a silicone having a SiH group.

The silicone having a SiH group includes, for example, a methylhydrogen silicone polymer having a degree of polymerization of 10 to 200 or a copolymer of dimethylsiloxane and methylhydrogensiloxane. Among these, the methylhydrogen silicone is preferred in terms of facilitation of industrial manufacturing and availability.

The α-olefin is a compound from which the long-chain hydrocarbon group is derived in the silicone polymer. Specific examples of α-olefin are 1-tricosene, 1-tetracosene, 1-hexacosene, 1-octacosene, 1-triacontene, and 1-dotriacontene.

A hydrosilylation reaction may be carried out by reacting the α-olefin with the aforementioned silicone having a SiH group stepwise or at once optionally in the presence of a catalyst.

The use amounts of the silicone having a SiH group and the α-olefin, which are used for the hydrosilylation reaction, are appropriately selected depending on the SiH group equivalent of the silicone having a SiH group or the number-average molecular weight thereof.

A catalyst used in the hydrosilylation reaction includes compounds of platinum and palladium, and among them, the platinum compound is preferred. The platinum compound includes platinum chloride (IV).

The reaction conditions for the hydrosilylation reaction are not limited and can be adjusted as appropriate. The reaction temperature is, for example, 10 to 200° C., preferably 50 to 150° C. The reaction time can be, for example, 3 to 12 hours when the reaction temperature is 50 to 150° C.

The hydrosilylation reaction is preferably carried out in an inert gas atmosphere. The inert gas includes, for example, nitrogen and argon. Although the reaction proceeds even in the absence of a solvent, a solvent may be used. The solvent includes, for example, dioxane, methyl isobutyl ketone, toluene, xylene, and butyl acetate.

The weight-average molecular weight (Mw) of the silicone polymer may be generally 200 to 100,000, for example, 500 to 50,000, and particularly 1,000 to 20,000. The weight-average molecular weight (Mw) of the silicone polymer is generally measured by GPC (gel permeation chromatography) and in terms of styrene.

The silicone polymer is preferably subjected to production of the water-repellent polymer in the form of liquid or a solid (for example, oil or wax) comprising no component other than the silicone polymer.

Alternatively, the silicone polymer may be subjected to the production of the water-repellent polymer in the form of a solution or an aqueous emulsion.

(2) Water-Repellent Polymer

The water-repellent polymer is a fluorine-containing polymer or a fluorine-free polymer. The fluorine-containing polymer is a polymer having a repeating unit derived from a fluorine-containing monomer having a fluoroalkyl group. The fluorine-free polymer is a polymer having a repeating unit derived from the long-chain hydrocarbon group-containing fluorine-free monomer.

The water-repellent polymer is a homopolymer having a repeating unit derived from the fluorine-containing monomer having a fluoroalkyl group or the fluorine-free monomer having a hydrocarbon group having 7 to 40 carbon atoms (i.e., the long-chain hydrocarbon group-containing fluorine-free monomer), a copolymer having repeating units derived from two or more monomers selected from the fluorine-containing monomer having a fluoroalkyl group and the long-chain hydrocarbon group-containing fluorine-free monomer, or a copolymer having a repeating unit derived from the fluorine-containing monomer having a fluoroalkyl group or the long-chain hydrocarbon group-containing fluorine-free monomer, and a repeating unit derived from another polymerizable compound capable of copolymerization.

The water-repellent polymer may be a random polymer or a block polymer.

The water-repellent polymer (2) may consist only of (2A) a repeating unit derived from the fluorine-containing monomer having a fluoroalkyl group and/or (2B) a repeating unit derived from the long-chain hydrocarbon group-containing fluorine-free monomer, however, the water-repellent polymer preferably has, in addition to the repeating units of (2A) and/or (2B), one or both of (2C) a repeating unit derived from the fluorine-free non-crosslinkable monomer and (2D) a repeating unit derived from the fluorine-free crosslinkable monomer.

The water-repellent polymer (2) has repeating units derived from one or both of (2A) the fluorine-containing monomer having a fluoroalkyl group and (2B) the long-chain hydrocarbon group-containing fluorine-free monomer. Namely, the water-repellent polymer (2) has one or both of (2A) the repeating unit derived from the fluorine-containing monomer having a fluoroalkyl group and (2B) the repeating unit derived from the long-chain hydrocarbon group-containing fluorine-free monomer.

(2A) Fluorine-Containing Monomer

The fluorine-containing monomer is generally a polymerizable compound having a perfluoroalkyl group or a perfluoroalkenyl group, and an acrylic acid group or a methacrylic acid group or an α-substituted acrylic acid group. The fluorine-containing monomer is generally a fluorine-containing acrylic monomer.

The fluorine-containing monomer is preferably a compound (acrylate ester or acrylamide) represented by the formula:

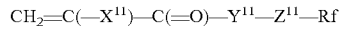

wherein $X^{11}$ is a hydrogen atom, a monovalent organic group or a halogen atom, $Y^{11}$ is —O— or —NH—, $Z^{11}$ is a direct bond or a divalent organic group, and Rf is a fluoroalkyl group having 1 to 20 carbon atoms.

$X^{11}$ may be, for example, a hydrogen atom, a linear or branched alkyl group having 1 to 21 carbon atoms, a fluorine atom, a chlorine atom, a bromine atom, an iodine atom, and a $CFX^1X^2$ group (wherein $X^1$ and $X^2$ are a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group, and a substituted or unsubstituted phenyl group.

Specific examples of $X^{11}$ are H, $CH_3$, Cl, Br, I, F, CN and $CF_3$. $X^{11}$ is preferably a hydrogen atom, a methyl group or a chlorine atom.

$Y^{11}$ is preferably —O—.

$Z^{11}$ may be, for example, a linear or branched aliphatic group having 1 to 20 carbon atoms (particularly an alkylene group), for example, the group represented by the formula —$(CH_2)_x$—, wherein x is 1 to 10, or the groups represented by the formula —$R^2(R^1)N$—$SO_2$— or the formula —$R^2(R^1)N$—CO—, wherein $R^1$ is an alkyl group having 1 to 10 carbon atoms and $R^2$ is a linear alkylene group or branched alkylene group having 1 to 10 carbon atoms, or the group represented by the formula —$CH_2CH(OR^3)CH_2$—(Ar—O)$_p$— wherein $R^3$ represents a hydrogen atom or an acyl group having 1 to 10 carbon atoms (for example, formyl or acetyl), Ar represents an arylene group optionally having a substituent, and p represents 0 or 1, or the group represented by the formula —$CH_2$—Ar—(O)$_q$—, wherein Ar is an arylene group optionally having a substituent, and q is 0 or 1, a —$(CH_2)_m$—$SO_2$—$(CH_2)_n$— group or a —$(CH_2)_m$—S—$(CH_2)_n$— group, wherein m is 1 to 10 and n is 0 to 10.

The $Z^{11}$ is preferably an aliphatic group having 1 to 10 carbon atoms, an aromatic group or a cyclic aliphatic group having 6 to 18 carbon atoms, a —$CH_2CH_2N(R^1)SO_2$— group wherein $R^1$ is an alkyl group having 1 to 4 carbon atoms, a —$CH_2CH(OZ^1)CH_2$—(Ph-O)$_p$— group wherein $Z^1$ is a hydrogen atom or an acetyl group, Ph is a phenylene group, and p is 0 or 1, a —$(CH_2)_n$-Ph-O— group wherein Ph is a phenylene group and n is 0 to 10), a —$(CH_2)_m$—$SO_2$—$(CH_2)_n$— group or a —$(CH_2)_m$—S—$(CH_2)_n$— group wherein m is 1 to 10 and n is 0 to 10. The aliphatic group is preferably an alkylene group (particularly the number of carbon atoms is 1 to 4, for example, 1 or 2). The aromatic or cyclic aliphatic group may be substituted or unsubstituted. The S group or $SO_2$ group may be directly bonded to the Rf group.

The Rf group is preferably a perfluoroalkyl group. The number of carbon atoms of the Rf group is preferably 1 to 12, for example, 1 to 6, particularly 4 to 6, and especially preferably 6. Examples of the Rf group include —$CF_3$, —$CF_2CF_3$, —$CF_2CF_2CF_3$, —$CF(CF_3)_2$, —$CF_2CF_2CF_2CF_3$, —$CF_2CF(CF_3)_2$, —$C(CF_3)_3$, —$(CF_2)_4CF_3$, —$(CF_2)_2CF(CF_3)_2$, —$CF_2C(CF_3)_3$, —$CF(CF_3)$ $CF_2CF_2CF_3$, —$(CF_2)_5$ $CF_3$, —$(CF_2)_3CF(CF_3)_2$, —$(CF_2)_4CF(CF_3)_2$, and —$C_8F_{17}$.

Specific examples of the fluorine-containing monomer include the followings, but are not limited thereto:

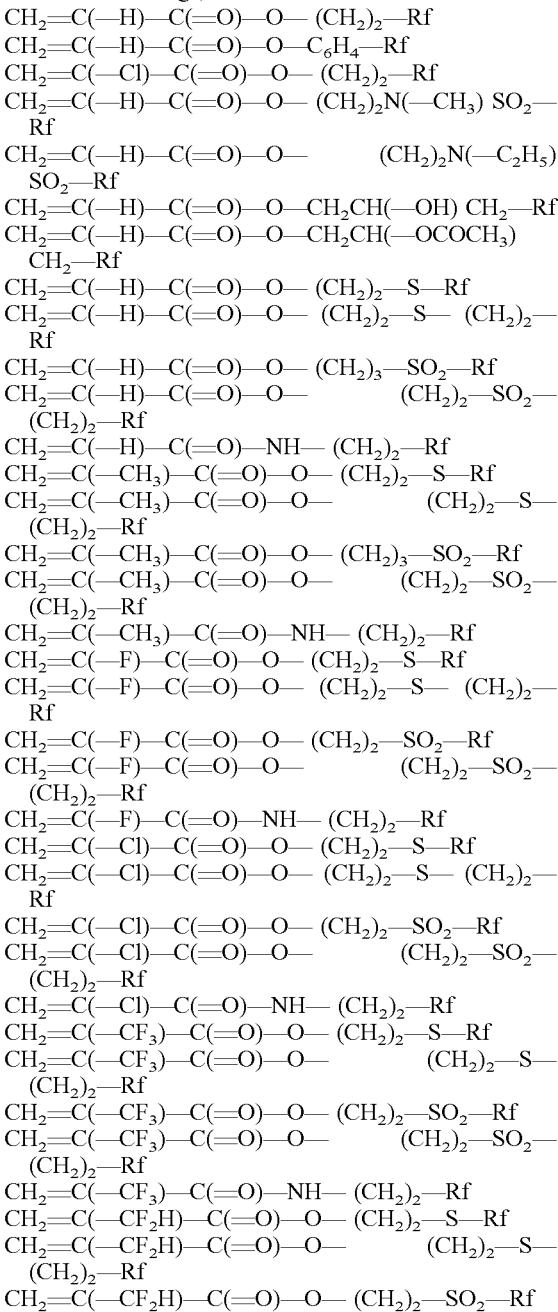

CH₂=C(—CF₂H)—C(=O)—O— (CH₂)₂—SO₂—(CH₂)₂—Rf
CH₂=C(—CF₂H)—C(=O)—NH— (CH₂)₂—Rf
CH₂=C(—CN)—C(=O)—O— (CH₂)₂—S—Rf
CH₂=C(—CN)—C(=O)—O— (CH₂)₂—S—(CH₂)₂—Rf
CH₂=C(—CN)—C(=O)—O— (CH₂)₂—SO₂—Rf
CH₂=C(—CN)—C(=O)—O— (CH₂)₂—SO₂—(CH₂)₂—Rf
CH₂=C(—CN)—C(=O)—NH— (CH₂)₂—Rf
CH₂=C(—CF₂CF₃)—C(=O)—O— (CH₂)₂—S—Rf
CH₂=C(—CF₂CF₃)—C(=O)—O— (CH₂)₂—S—(CH₂)₂—Rf
CH₂=C(—CF₂CF₃)—C(=O)—O— (CH₂)₂—SO₂—Rf
CH₂=C(—CF₂CF₃)—C(=O)—O— (CH₂)₂—SO₂—(CH₂)₂—Rf
CH₂=C(—CF₂CF₃)—C(=O)—NH— (CH₂)₂—Rf
CH₂=C(—F)—C(=O)—O— (CH₂)₃—S—Rf
CH₂=C(—F)—C(=O)—O— (CH₂)₃—S— (CH₂)₂—Rf
CH₂=C(—F)—C(=O)—O— (CH₂)₃—SO₂—Rf
CH₂=C(—F)—C(=O)—O— (CH₂)₃—SO₂—(CH₂)₂—Rf
CH₂=C(—F)—C(=O)—NH— (CH₂)₃—Rf
CH₂=C(—Cl)—C(=O)—O— (CH₂)₃—S—Rf
CH₂=C(—Cl)—C(=O)—O— (CH₂)₃—S— (CH₂)₂—Rf
CH₂=C(—Cl)—C(=O)—O— (CH₂)₃—SO₂—Rf
CH₂=C(—Cl)—C(=O)—O— (CH₂)₃—SO₂—(CH₂)₂—Rf
CH₂=C(—CF₃)—C(=O)—O— (CH₂)₃—S—Rf
CH₂=C(—CF₃)—C(=O)—O— (CH₂)₃—S—(CH₂)₂—Rf
CH₂=C(—CF₃)—C(=O)—O— (CH₂)₃—SO₂—Rf
CH₂=C(—CF₃)—C(=O)—O— (CH₂)₃—SO₂—(CH₂)₂—Rf
CH₂=C(—CF₂H)—C(=O)—O— (CH₂)₃—S—Rf
CH₂=C(—CF₂H)—C(=O)—O— (CH₂)₃—S—(CH₂)₂—Rf
CH₂=C(—CF₂H)—C(=O)—O— (CH₂)₃—SO₂—Rf
CH₂=C(—CF₂H)—C(=O)—O— (CH₂)₃—SO₂—(CH₂)₂—Rf
CH₂=C(—CN)—C(=O)—O— (CH₂)₃—S—Rf
CH₂=C(—CN)—C(=O)—O— (CH₂)₃—S—(CH₂)₂—Rf
CH₂=C(—CN)—C(=O)—O— (CH₂)₃—SO₂—Rf
CH₂=C(—CN)—C(=O)—O— (CH₂)₃—SO₂—(CH₂)₂—Rf
CH₂=C(—CF₂CF₃)—C(=O)—O— (CH₂)₃—S—Rf
CH₂=C(—CF₂CF₃)—C(=O)—O— (CH₂)₃—S—(CH₂)₂—Rf
CH₂=C(—CF₂CF₃)—C(=O)—O— (CH₂)₃—SO₂—Rf
CH₂=C(—CF₂CF₃)—C(=O)—O—(CH₂)₂—SO₂—(CH₂)₂—Rf wherein Rf is a fluoroalkyl group having 1 to 20 carbon atoms.

(2B) Long-Chain Hydrocarbon Group-Containing Fluorine-Free Monomer

The long-chain hydrocarbon group-containing fluorine-free monomer does not have a fluoroalkyl group. The long-chain hydrocarbon group-containing fluorine-free monomer does not comprise a fluorine atom.

The carbon number of the long-chain hydrocarbon group is preferably 7 to 40, for example, 10 to 40, particularly 12 to 30, and especially 15 to 30 (or 15 to 35). The long-chain hydrocarbon group is preferably a linear or branched hydrocarbon group. The long-chain hydrocarbon group is a saturated or unsaturated group. The long-chain hydrocarbon group is preferably a saturated hydrocarbon group, particularly an alkyl group.

The long-chain hydrocarbon group-containing fluorine-free monomer is generally a fluorine-free acrylic monomer having a long-chain hydrocarbon group.

The long-chain hydrocarbon group-containing fluorine-free monomer (2B) is preferably a monomer represented by the formula:

$$CH_2=C(-X^{21})-C(=O)-Y^{21}-(R^{21})_k \quad (a1)$$

wherein $R^{21}$ is a hydrocarbon group having 7 to 40 carbon atoms, $X^{21}$ is a hydrogen atom, a methyl group or a halogen atom, $Y^{21}$ is a group (excluding a hydrocarbon group) composed of at least one group selected from the group consisting of a divalent, trivalent or tetravalent hydrocarbon group having 1 carbon atom (particularly —CH₂— or —CH=), —C₆H₄—, —O—, —C(=O)—, —S(=O)₂— and —NH—, and k is 1 to 3, and the long-chain hydrocarbon group-containing fluorine-free monomer is preferably a (meth)acrylic monomer.

$Y^{21}$ is a divalent to tetravalent group. $Y^{21}$ is preferably a divalent or trivalent group, particularly a divalent group.

$Y^{21}$ may be a group (excluding a hydrocarbon group) composed of at least one selected from the group consisting of a hydrocarbon group having 1 carbon atom, —C₆H₄—, —O—, —C(=O)—, —S(=O)₂— and —NH—. Examples of the hydrocarbon group having 1 carbon atom include —CH₂—, —CH=having a branched structure, and —C≡ having a branched structure.

$Y^{21}$ may be —Y'—, —Y'—Y'—, —Y'—C(=O)—, —C(=O)—Y'—, —Y'—C(=O)—Y'—, —Y'—R'—, —Y'—R'—Y'—, —Y'—R'—Y'—C(=O)—, —Y'—R'—C(=O)—Y'—, —Y'—R'—Y'—C(=O)—Y'—, or —Y'—R'—Y'—R'—, wherein Y' is a direct bond, —O—, —NH— or —S(=O)₂—, R' is —(CH₂)ₘ— (m is an integer of 1 to 5) or —C₆H₄— (phenylene group).

Specific examples of $Y^{21}$ are —O—, —NH—, —O—C(=O)—, —C(=O)—NH—, —NH—C(=O)—, —O—C(=O)—NH—, —NH—C(=O)—O—, —NH—C(=O)—NH—, —O—C₆H₄—, —O—(CH₂)ₘ—O—, —NH—(CH₂)ₘ—NH—, —O—(CH₂)ₘ—NH—, —NH—(CH₂)ₘ—O—, —O— (CH₂)ₘ—O—C(=O)—, —O—(CH₂)ₘ—C(=O)—O—, —NH—(CH₂)ₘ—O—C(=O)—, —NH—(CH₂)ₘ—C(=O)—O—, —O—(CH₂)ₘ—O—C(=O)—NH—, —O— (CH₂)ₘ—NH—C(=O)—O—, —O—(CH₂)ₘ—C(=O)—NH—, —O—(CH₂)ₘ—NH—C(=O)—, —O—(CH₂)ₘ—NH—C(=O)—NH—, —O—(CH₂)ₘ—O—C₆H₄—, —O—(CH₂)ₘ—NH—S(=O)₂—, —O—(CH₂)ₘ—S(=O)₂—NH—, —NH—(CH₂)ₘ—O—C(=O)—NH—, —NH—(CH₂)ₘ—NH—C(=O)—O—, —NH—(CH₂)ₘ—C(=O)—NH—, —NH—(CH₂)ₘ—NH—C(=O)—, —NH—(CH₂)ₘ—NH—C(=O)—NH—, —NH—(CH₂)ₘ—O—C₆H₄—, —NH— (CH₂)ₘ—NH—C₆H₄—, —NH—(CH₂)ₘ—NH—S(=O)₂—, and —NH—(CH₂)ₘ—S(=O)₂—NH—, wherein m is 1 to 5, particularly 2 or 4.

When $Y^{21}$ is divalent, k is 1, when $Y^{21}$ is trivalent, k is 2, and when $Y^{21}$ is tetravalent, k is 3.

An example of the acrylic monomer having a long-chain hydrocarbon group is the acrylic monomer represented by the formula:

$$CH_2=C(-X^{24})-C(=O)-Y^{22}-R^{22} \quad (a2)$$

wherein $R^{22}$ is a hydrocarbon group having 7 to 40 carbon atoms,
$X^{24}$ is a hydrogen atom, a methyl group or a halogen atom,
$Y^{22}$ is —O— or —NH—, and the urethane monomer represented by the formula:

$$CH_2=C(-X^{25})-C(=O)-Y^{23}-Z(-Y^{24}-R^{23})_m \quad (a3)$$

wherein $R^{23}$ is a hydrocarbon group having 7 to 40 carbon atoms, $X^{25}$ is a hydrogen atom, a methyl group or a halogen atom,
$Y^{23}$ is —O— or —NH—,
$Y^{24}$ is —O—C(=O)—NH—, —NH—C(=O)—O— or —NH—C(=O)—NH—,
Z is a divalent or trivalent hydrocarbon group having 1 to 5 carbon atoms, and
m is 1 or 2.

In the present description, the urethane monomer also includes a urea monomer having a urea group.

The urethane monomer (a3) can be produced by reacting a hydroxyalkyl (meth)acrylate or a hydroxyalkyl (meth)acrylamide with a long-chain alkyl isocyanate. In the hydroxyalkyl (meth)acrylate and hydroxyalkyl (meth)acrylamide, examples of the alkyl are alkyl groups having 2 to 10 carbon atoms, for examples, an ethyl group, a propyl group, a butyl group, a hexane group, and a decane group. The long-chain alkyl isocyanate includes, for example, lauryl isocyanate, myristyl isocyanate, cetyl isocyanate, stearyl isocyanate, oleyl isocyanate, and behenyl isocyanate.

Alternatively, the urethane monomer (a3) can also be produced by reacting a (meth)acrylate having an isocyanate group in a side chain, for example, 2-methacryloyloxyethyl isocyanate with a long-chain alkyl amine or a long-chain alkyl alcohol. Example of the long-chain alkyl amine includes laurylamine, myristylamine, cetylamine, stearylamine, oleylamine, and behenylamine. Example of the long-chain alkyl alcohol includes lauryl alcohol, myristyl alcohol, cetyl alcohol, stearyl alcohol, oleyl alcohol, and behenyl alcohol.

Preferred examples of the long-chain alkyl group-containing acrylic monomer are as follows:
Stearyl (meth)acrylate, behenyl (meth)acrylate, stearyl α-chloroacrylate, behenyl α-chloroacrylate; stearyl (meth)acrylamide, behenyl (meth)acrylamide;

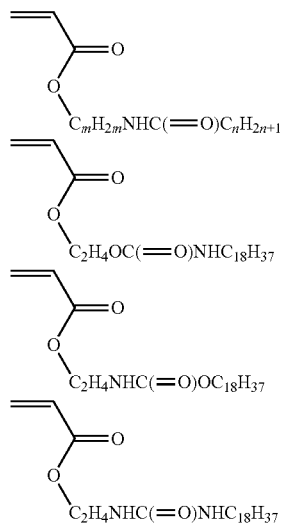

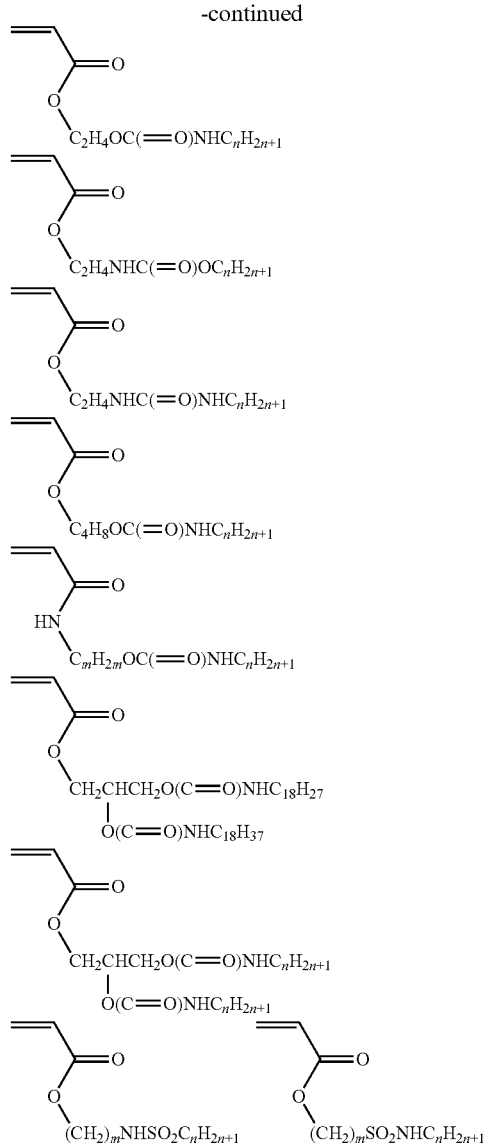

wherein m is a numeral of 1 to 5 and n is a numeral of 7 to 40.

The compounds having the above chemical formulae each are an acrylic compound in which the α-position is a hydrogen atom, but specific examples thereof may be a methacrylic compound in which the α-position is a methyl group and an α-chloroacrylic compound in which the α-position is a chlorine atom.

The melting point of the long-chain hydrocarbon group-containing fluorine-free monomer (2B) is preferably 10° C. or higher, more preferably 25° C. or higher.

The long-chain hydrocarbon group-containing fluorine-free monomer (2B) is preferably an acrylate in which $X^{21}$, $X^{24}$ and $X^{25}$ are hydrogen atoms, particularly preferably a stearyl acrylate.

The water-repellent polymer (2) preferably has, in addition to the repeating units of (2A) and/or (2B) (i.e., repeating units derived from the monomer (2A) and/or the monomer (2B)), one or both of (2C) a repeating unit derived from the fluorine-free non-crosslinkable monomer and (2D) a repeating unit derived from the fluorine-free crosslinkable monomer.

(2C) Fluorine-Free Non-Crosslinkable Monomer

The fluorine-free non-crosslinkable monomer (2C) is a monomer other than the long-chain hydrocarbon group-containing fluorine-free monomer (2B). The fluorine-free non-crosslinkable monomer (2C) is a monomer comprising no fluorine atom. The fluorine-free non-crosslinkable monomer (2C) does not have a crosslinkable functional group. The fluorine-free non-crosslinkable monomer (2C) is non-crosslinkable unlike the crosslinkable monomer (2D). The fluorine-free non-crosslinkable monomer (2C) is preferably a fluorine-free monomer having a carbon-carbon double bond. The fluorine-free non-crosslinkable monomer (2C) is preferably a vinyl monomer comprising no fluorine. The fluorine-free non-crosslinkable monomer (2C) is generally a compound having one carbon-carbon double bond.

The preferred fluorine-free non-crosslinkable monomer (2C) is the compound represented by the formula:

$$CH_2=CA-T$$

wherein A is a hydrogen atom, a methyl group, or a halogen atom other than a fluorine atom (for example, a chlorine atom, a bromine atom, and an iodine atom), and T is a hydrogen atom, a chain or cyclic hydrocarbon group having 1 to 40 carbon atoms, or a chain or cyclic organic group having 1 to 41 carbon atoms and having an ester bond.

The chain or cyclic hydrocarbon group having 1 to 40 carbon atoms includes, for example, a linear or branched aliphatic hydrocarbon group having 1 to 40 carbon atoms, a cyclic aliphatic group having 4 to 40 carbon atoms, an aromatic hydrocarbon group having 6 to 40 carbon atoms, or an aromatic-aliphatic hydrocarbon group having 7 to 40 carbon atoms.

The chain or cyclic organic group having 1 to 41 carbon atoms and having an ester bond is, for example, —C(=O)—O-Q and —O—C(=O)-Q wherein Q is a linear or branched aliphatic hydrocarbon group having 1 to 40 carbon atoms, a cyclic aliphatic group having 4 to 40 carbon atoms, an aromatic hydrocarbon group having 6 to 40 carbon atoms, or an aromatic-aliphatic hydrocarbon group having 7 to 40 carbon atoms.

The preferred fluorine-free non-crosslinkable monomer (2C) includes, for example, ethylene, vinyl acetate, acrylonitrile, styrene, polyethylene glycol (meth)acrylate, polypropylene glycol (meth)acrylate, methoxypolyethylene glycol (meth)acrylate, methoxypolypropylene glycol (meth) acrylate, and vinyl alkyl ether. The fluorine-free non-crosslinkable monomers (2C) are not limited to these examples.

The fluorine-free non-crosslinkable monomer (2C) may be, for example, a (meth)acrylate ester having an alkyl group. The number of carbon atoms in the alkyl group may be 1 to 17, for example, 1 to 10. For example, the fluorine-free non-crosslinkable monomer (2C) may be an acrylate represented by the general formula:

$$CH_2=CA^1COOA^2$$

wherein $A^1$ is a hydrogen atom, a methyl group, or a halogen atom other than a fluorine atom (for example, a chlorine atom, a bromine atom, and an iodine atom), and $A^2$ is an alkyl group represented by $C_nH_{2n+1}$ (n=1 to 17).

The fluorine-containing monomer may not have a repeating unit derived from a (meth)acrylate ester having an alkyl group having 1 to 17 carbon atoms.

The fluorine-free non-crosslinkable monomer (2C) may be, for example, a (meth)acrylate monomer having a cyclic hydrocarbon group. The (meth)acrylate monomer having the cyclic hydrocarbon group is a compound having a (preferably monovalent) cyclic hydrocarbon group and a monovalent (meth)acrylate group. The monovalent cyclic hydrocarbon group and the monovalent (meth)acrylate group are directly bonded. The cyclic hydrocarbon group includes a monocyclic group, a polycyclic group, and a bridged ring group, which are saturated or unsaturated. The cyclic hydrocarbon group is preferably saturated. The cyclic hydrocarbon group preferably has 4 to 20 carbon atoms. The cyclic hydrocarbon group includes a cyclic aliphatic group having 4 to 20 carbon atoms, particularly 5 to 12 carbon atoms, an aromatic group having 6 to 20 carbon atoms, and an aromatic aliphatic group having 7 to 20 carbon atoms. The number of carbon atoms of the cyclic hydrocarbon group is preferably 15 or less, and, for example, particularly preferably 10 or less. Preferably, the carbon atom in the ring of the cyclic hydrocarbon group is directly bonded to an ester group in a (meth)acrylate group. The cyclic hydrocarbon group is preferably a saturated cyclic aliphatic group.

Specific examples of the cyclic hydrocarbon group are a cyclohexyl group, a t-butylcyclohexyl group, an isobornyl group, a dicyclopentanyl group, a dicyclopentenyl group, and an adamantyl group. The acrylate group is preferably an acrylate group or a methacrylate group, and a methacrylate group is particularly preferred. Specific examples of the monomer having the cyclic hydrocarbon group include cyclohexyl (meth)acrylate, t-butylcyclohexyl (meth)acrylate, benzyl (meth)acrylate, isobornyl (meth)acrylate, dicyclopentanyl (meth)acrylate, dicyclopentenyl (meth)acrylate, dicyclopentanyloxyethyl (meth)acrylate, tricyclopentanyl (meth)acrylate, adamantyl (meth)acrylate, 2-methyl-2-adamantyl (meth)acrylate, and 2-ethyl-2-adamantyl (meth)acrylate.

The fluorine-free non-crosslinkable monomer (2C) may be, for example, a halogenated olefin. The halogenated olefin may be, for example, a halogenated olefin having 2 to 20 carbon atoms, substituted with 1 to 10 chlorine atoms, bromine atoms or iodine atoms. The halogenated olefin is preferably a chlorinated olefin having 2 to 20 carbon atoms, particularly an olefin having 1 to 5 chlorine atoms, and having 2 to 5 carbon atoms. Preferred specific examples of the halogenated olefin are vinyl halides, such as vinyl chloride, vinyl bromide, vinyl iodide, and vinylidene halides, such as vinylidene chloride, vinylidene bromide, and vinylidene iodide.

(2D) Fluorine-Free Crosslinkable Monomer

The water-repellent polymer may have a repeating unit derived from the fluorine-free crosslinkable monomer (2D). The fluorine-free crosslinkable monomer (2D) is a monomer comprising no fluorine atom. The fluorine-free crosslinkable monomer (2D) may be, for example, a compound having at least two reactive groups and/or carbon-carbon double bonds and comprising no fluorine. The fluorine-free crosslinkable monomer (2D) may be, for example, a compound having at least two carbon-carbon double bonds, or a compound having at least one carbon-carbon double bond and at least one reactive group. Examples of the reactive group include a hydroxyl group, an epoxy group, a chloromethyl group, a blocked isocyanate group, an amino group, and a carboxyl group.

Examples of the fluorine-free crosslinkable monomer (2D) include diacetone acrylamide, (meth)acrylamide, N-methylol acrylamide, hydroxymethyl (meth)acrylate, hydroxyethyl (meth)acrylate, 3-chloro-2-hydroxypropyl (meth)acrylate, 2-acetoacetoxyethyl (meth)acrylate, N, N-dimethylaminoethyl (meth)acrylate, N, N-diethylaminoethyl (meth)acrylate, 2-chloroethyl (meth)acrylate, butadiene, isoprene, chloroprene, glycidyl (meth)acrylate, but are not limited thereto.

By copolymerizing the fluorine-free non-crosslinkable monomer (2C) and/or the fluorine-free crosslinkable monomer (2D), various properties, such as water- and oil-repellency, antifouling property, cleaning durability and washing durability thereof, solubility in a solvent, hardness, and feeling, can be improved as needed.

The monomers (2A), (2B), (2C) and (2D) are prepared and polymerized in the presence of the silicone polymer (1) to obtain the water-repellent polymer (2).

Although not bound by theory, the water-repellent polymer (2) is considered to form the same particles in the emulsion, together with the silicone polymer (1).

The amount of the silicone polymer (1) may be 20 to 95% by weight, for example 30 to 90% by weight, and particularly 40 to 88% by weight, based on the total weight of the silicone polymer (1) and the water-repellent polymer (2). The amount of the silicone polymer (1) may be 51% by weight or more, for example 55% by weight or more.

The amount of the water-repellent polymer (2) may be 5 to 80% by weight, for example 10 to 70% by weight, and particularly 12 to 60% by weight, based on the total weight of the silicone polymer (1) and the water-repellent polymer (2).

Each of the monomers (2A), (2B), (2C) and (2D) may be one type alone or a combination of two or more types.

Each amount of the fluorine-containing monomer (2A) and the long-chain hydrocarbon group-containing fluorine-free monomer (2B) (or the total amount of the monomer (2A) and the monomer (2B)) (however, the total amount of the monomer (2A) and the monomer (2B) is 100% by weight or less), may be 30 to 100% by weight, preferably 32 to 98% by weight, for example 35 to 95%, and particularly 40 to 90% by weight, based on the water-repellent polymer.

In the water-repellent polymer, only one of the fluorine-containing monomer (2A) or the long-chain hydrocarbon group-containing fluorine-free monomer (2B) may be present, or in the water-repellent polymer, both of the fluorine-containing monomer (2A) and the long-chain hydrocarbon group-containing fluorine-free monomer (2B) may be present. When in the water-repellent polymer, both the fluorine-containing monomer (2A) and the long-chain hydrocarbon group-containing fluorine-free monomer (2B) are present, the amount of the fluorine-containing monomer (2A) may be 10 to 90% by weight, for example, 30 to 70% or 25 to 49%, based on the total amount of the monomer (2A) and the monomer (2B).

In the water-repellent polymer, based on 100 parts by weight of the total amount of the fluorine-containing monomer (2A) and the long-chain hydrocarbon group-containing fluorine-free monomer (2B), the amount of the fluorine-free non-crosslinkable monomer (2C) is 1,000 parts by weight or less, for example, 0.1 to 300 parts by weight, particularly 1 to 200 parts by weight, the amount of the fluorine-free crosslinkable monomer (2D) may be 50 parts by weight or less, for example, 30 parts by weight or less, particularly 0.1 to 20 parts by weight.

The amount of the fluorine-free non-crosslinkable monomer (2C) is 2 to 68% by weight, for example 5 to 65% by weight, and particularly 10 to 60% by weight, based on the water-repellent polymer (or the total amount of the monomer (2A), monomer (2B) and monomer (2C)).

The weight-average molecular weight (Mw) of the water-repellent polymer may be generally 1,000 to 1,000,000, for example 2,000 to 500,000, particularly 3,000 to 200,000. The weight-average molecular weight (Mw) of the water-repellent polymer is generally measured by GPC (gel permeation chromatography) and converted in terms of styrene.

(3) Liquid Medium

The softening agent composition comprises a liquid medium. The liquid medium may be an organic solvent, but is preferably water or a mixture of water and an organic solvent.

The softening agent composition is generally a solution or dispersion. The solution is a solution in which a polymer is dissolved in an organic solvent. The dispersion is an aqueous dispersion in which a polymer is dispersed in an aqueous medium (water or a mixture of water and an organic solvent).

The organic solvent is, for example, esters (for example, esters having 2 to 40 carbon atoms, specifically ethyl acetate and butyl acetate), ketones (for example, ketones having 2 to 40 carbon atoms, specifically methyl ethyl ketone and diisobutyl ketones), alcohols (for example, alcohols having 1 to 40 carbon atoms, specifically isopropyl alcohol), aromatic solvents (for example, toluene and xylene), petroleum solvent (for example, alkanes having 5 to 10 carbon atoms, specifically naphtha and kerosene).

The liquid medium may be, for example, water alone or a mixture of water and a (water-miscible) organic solvent. The amount of the organic solvent may be, 30% by weight or less, for example, 10% by weight or less (preferably 0.1% by weight or more), based on the liquid medium.

The amount of the liquid medium may be, for example, 5 to 99.9% by weight, particularly 10 to 80% by weight, based on the softening agent composition.

(4) Emulsifier (Surfactant)

Generally, the softening agent composition is an aqueous dispersion. The softening agent composition comprises an emulsifier (surfactant).

When the silicone polymer is in the form of an aqueous dispersion before producing the softening agent composition, the aqueous dispersion preferably comprises a surfactant.

In the softening agent composition, the surfactant comprises a nonionic surfactant. Further, the surfactant may comprise one or more surfactants selected from a cationic surfactant, an anionic surfactant, and an amphoteric surfactant. The surfactant may be the nonionic surfactant alone, or may be a combination of the nonionic surfactant and the cationic surfactant.

(4A) Nonionic Surfactant

The nonionic surfactant includes, for example, an ether, an ester, an ester ether, an alkanolamide, a polyhydric alcohol, and an amine oxide.

The ether is, for example, a compound having an oxyalkylene group (preferably a polyoxyethylene group).

The ester is, for example, an ester of an alcohol and a fatty acid. The alcohol is, for example, an alcohol which is monohydric to hexahydric (particularly dihydric to pentahydric) and has 1 to 50 carbon atoms (particularly 10 to 30 carbon atoms) (for example, an aliphatic alcohol). The fatty acid is, for example, a saturated or unsaturated fatty acid having 2 to 50 carbon atoms, particularly 5 to 30 carbon atoms.

The ester ether is, for example, a compound in which an alkylene oxide (particularly ethylene oxide) is added to an ester of an alcohol and a fatty acid. The alcohol is, for example, an alcohol which is monohydric to hexahydric (particularly dihydric to pentahydric) and has 1 to 50 carbon atoms (particularly 3 to 30 carbon atoms) (for example, an aliphatic alcohol). The fatty acid is, for example, a saturated or unsaturated fatty acid having 2 to 50 carbon atoms, particularly 5 to 30 carbon atoms.

The alkanolamide is formed from, for example, a fatty acid and an alkanolamine. The alkanolamide may be a monoalkanolamide or a dialkanolamide. The fatty acid is, for example, a saturated or unsaturated fatty acid having 2 to 50 carbon atoms, particularly 5 to 30 carbon atoms. The alkanolamine may be, for example, an alkanol with 1 to 3 amino groups and 1 to 5 hydroxyl groups, having 2 to 50 carbon atoms, particularly 5 to 30 carbon atoms.

The polyhydric alcohol may be, for example, a dihydric to pentahydric alcohol having 10 to 30 carbon atoms.

The amine oxide may be an oxide of an amine (a secondary amine or preferably a tertiary amine) (for example, the one having 5 to 50 carbon atoms).

The nonionic surfactant is preferably a nonionic surfactant having an oxyalkylene group (preferably a polyoxyethylene group). The alkylene group in the oxyalkylene group preferably has 2 to 10 carbon atoms. The number of oxyalkylene groups in the molecule of the nonionic surfactant is generally preferably 2 to 100.

The nonionic surfactant is selected from the group consisting of an ether, an ester, an ester ether, an alkanolamide, a polyhydric alcohol and an amine oxide, and is preferably a nonionic surfactant having an oxyalkylene group.

The nonionic surfactant may be an alkylene oxide adduct of a linear and/or branched aliphatic group (saturated and/or unsaturated), a polyalkylene glycol ester of a linear and/or branched fatty acid (saturated and/or unsaturated), a polyoxyethylene (POE)/polyoxypropylene (POP) copolymer (random copolymer or block copolymer), or an alkylene oxide adduct of an acetylene glycol. Among these, the structures of the alkylene oxide addition moiety and the polyalkylene glycol moiety each are preferably the polyoxyethylene (POE) or the polyoxypropylene (POP) or the POE/POP copolymer (which may be, for example, a block copolymer or a random copolymer).

Moreover, the nonionic surfactant preferably has a structure free from an aromatic group due to the environmental problems (such as biodegradability, and environmental hormones).

The nonionic surfactant may be the compound represented by the formula:

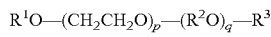

$R^1O—(CH_2CH_2O)_p—(R^2O)_q—R^3$ wherein $R^1$ is an alkyl group having 1 to 22 carbon atoms, or an alkenyl group or an acyl group, having 2 to 22 carbon atoms, $R^2$ each is independently the same or different and is an alkylene group having 3 or more carbon atoms (for example, 3 to 10), $R^3$ is a hydrogen atom, an alkyl group having 1 to 22 carbon atoms or an alkenyl group having 2 to 22 carbon atoms, p is a numeral of 2 or larger, and q is a numeral of 0, or 1 or larger.

$R^1$ preferably has 8 to 20 carbon atoms, particularly 10 to 18 carbon atoms. Preferred specific examples of $R^1$ include a lauryl group, a tridecylic group, and an oleyl group.

$R^2$ is, for example, a propylene group and a butylene group.

In the nonionic surfactant, for example, p may be a numeral of 3 or more (for example, 5 to 200) and q may be a numeral of 2 or more (for example, 5 to 200). Namely, $—(R^2O)_q—$ may form, for example, a polyoxyalkylene chain.

The nonionic surfactant may be, for example, a polyoxyethylene alkylene alkyl ether comprising a hydrophilic polyoxyethylene chain and a hydrophobic oxyalkylene chain (particularly a polyoxyalkylene chain) in the center. The hydrophobic oxyalkylene chain includes, for example, an oxypropylene chain, an oxybutylene chain, and a styrene chain. The oxypropylene chain is preferred among them.

Specific examples of the nonionic surfactant include condensation products of ethylene oxide with hexylphenol, isooctylphenol, hexadecanol, oleic acid, an alkane ($C_{12}$ to $C_{16}$) thiol, sorbitan monofatty acid ($C_7$ to $C_{19}$), or an alkyl ($C_{12}$ to $C_{18}$) amine.

The proportion of the polyoxyethylene block can be 5 to 80% by weight, for example, 30 to 75% by weight, particularly 40 to 70% by weight, based on a molecular weight of the nonionic surfactant (copolymer).

The average molecular weight of the nonionic surfactant is generally 300 to 5,000, for example, 500 to 3,000.

The nonionic surfactant may be, for example, a single type or a mixture of two or more types.

(4B) Cationic Surfactant

The cationic surfactant is preferably a compound having no amide group.

The cationic surfactant may be, for example, an amine salt, a quaternary ammonium salt, or an oxyethylene-added ammonium salt. Specific examples of the cationic surfactants are not limited, but include amine salt-type surfactants, such as an alkylamine salt, an aminoalcohol fatty acid derivative, a polyamine fatty acid derivative, and imidazoline; and quaternary ammonium salt-type surfactants, such as an alkyltrimethylammonium salt, a dialkyldimethylammonium salt, an alkyldimethylbenzylammonium salt, a pyridinium salt, an alkylisoquinolinium salt, and benzethonium chloride.

A preferred example of the cationic surfactant is a compound represented by the formula:

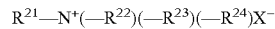

$R^{21}—N^+(—R^{22})(—R^{23})(—R^{24})X^-$ wherein $R^{21}$, $R^{22}$, $R^{23}$ and $R^{24}$ are hydrocarbon groups having 1 to 40 carbon atoms and X is an anionic group.

Specific examples of $R^{21}$, $R^{22}$, $R^{23}$ and $—R^{24}$ are alkyl groups (for example, a methyl group, a butyl group, a stearyl group, and a palmityl group). Specific examples of X are halogens (for example, a chlorine atom) and acids (for example, hydrochloric acid and acetic acid).

The cationic surfactant is particularly preferably a monoalkyltrimethylammonium salt (with an alkyl having 4 to 40 carbon atoms).

The cationic surfactant is preferably an ammonium salt. The cationic surfactant may be an ammonium salt represented by the formula:

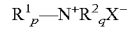

$R^1_p—N^+R^2_qX^-$ wherein $R^1$ is a linear and/or branched aliphatic group (saturated and/or unsaturated) of $C_{12}$ or higher (for example, $C_{12}$ to $C_{50}$), $R^2$ is H or an alkyl group of $C_1$ to $C_4$, a benzyl group, or a polyoxyethylene group (the number of the oxyethylene group is, for example, 1 (particularly 2, especially 3) to 50) ($CH_3$ and $C_2H_5$ are particularly preferred), X is a halogen atom (for example, a chlorine atom) and a fatty acid base of $C_1$ to $C_4$, p is 1 or 2, q is 2 or 3, and p+q=4. The number of carbon of $R^1$ may be 12 to 50, for example, 12 to 30.

Specific examples of the cationic surfactant include dodecyltrimethylammonium acetate, trimethyltetradecylammonium chloride, hexadecyltrimethylammonium bromide, trimethyloctadecylammonium chloride, (dodecylmethylbenzyl) trimethylammonium chloride, benzyldodecyldimethylammonium chloride, methyldodecyldi(hydropolyoxyethylene)ammonium chloride, benzyldodecyldi(hydropolyoxyethylene)ammonium chloride, N-[2-(diethylamino)ethyl]oleamide hydrochloride salt.

The amphoteric surfactant includes, for example, alanines, imidazolinium betaines, amide betaines, and betaine acetate. Specific examples of the amphoteric surfactant include lauryl betaine, stearyl betaine, laurylcarboxymethyl hydroxyethyl imidazolinium betaine, lauryldimethylaminoacetic acid betaine, and fatty acid amide propyldimethylaminoacetic acid betaine.

The amount of the emulsifier (4) may be 0.1 to 20 parts by weight, for example, 1 to 10 parts by weight, based on 100 parts by weight of the total amount of the silicone polymer (1) and the water-repellent polymer (3).

Each of the nonionic surfactant, the cationic surfactant, and the amphoteric surfactant may be, for example, one type or a combination of two or more thereof.

The amount of the cationic surfactant may be, for example, 5% by weight or more, preferably 10% by weight or more, and more preferably 20% by weight or more, based on the total amount of the surfactants. The weight ratio of the nonionic surfactant to the cationic surfactant is preferably 95:5 to 20:80 and more preferably 85:15 to 40:60.

The amount of the cationic surfactant may be 0.05 to 10 parts by weight, for example, 0.1 to 8 parts by weight, based on 100 parts by weight of the polymer. The total amount of the surfactants may be 0.1 to 20 parts by weight, for example, 0.2 to 10 parts by weight, based on 100 parts by weight of the polymer.

(5) Other Components

The surface treatment agent may comprise an additive as another component in addition to the silicone polymer, the water-repellent polymer, the liquid medium and the surfactant.

Examples of the additive include a silicon-containing compound, wax, and an acrylic emulsion. Other examples of the additive include, a drying rate adjuster, a cross-linking agent, a film formation agent, a compatibilizing agent, a surfactant, an antifreezing agent, a viscosity modifier, a UV absorber, an antioxidant, a pH adjuster, an antifoaming agent, a feeling modifier, a slippage modifier, an antistatic agent, a hydrophilizing agent, an antibacterial agent, a preservative, an insect repellent, a fragrant agent, and a flame retarder.

Generally, after adding a monomer constituting the water-repellent polymer, the surfactant and water, and optionally an organic solvent, to the silicone polymer which is preferably oily or waxy (silicone oil or silicone wax), the softening agent composition can be produced by polymerizing the monomer.

The softening agent composition is preferably produced by emulsion polymerization. Alternatively, solution polymerization or suspension polymerization can be employed.

In the emulsion polymerization, a method of emulsifying a monomer in water in the presence of a polymerization initiator and a surfactant (emulsifier), replacing the atmosphere with nitrogen, and then polymerizing with stirring in the range of 50 to 80° C. for 1 to 10 hours, is employed. The polymerization initiators are used, including water-soluble initiators, such as benzoyl peroxide, lauroyl peroxide, t-butyl perbenzoate, 1-hydroxycyclohexylhydro peroxide, 3-carboxypropionyl peroxide, acetyl peroxide, azobisisobutyamidine-dihydrochloride salt, sodium peroxide, potassium persulfate, and oil-soluble initiators, such as azobisisobutyronitrile, benzoyl peroxide, di-t-butyl peroxide, lauryl peroxide, cumene hydroperoxide, t-butyl peroxypivalate, and diisopropylperoxydicarbonate. The polymerization initiator is used in the range of 0.01 to 10 parts by weight, based on 100 parts by weight of the monomer.

In order to obtain an aqueous dispersion of polymer having excellent standing stability, it is desirable to micronize the monomer in water and then polymerize by using an emulsifying apparatus, such as a high-pressure homogenizer or an ultrasonic homogenizer which can apply intense crushing energy. Moreover, the emulsifying agent can be any of various types of anionic, cationic, and nonionic emulsifying agents, and is used in the range of 0.5 to 20 parts by weight, based on 100 parts by weight of the monomer. The anionic and/or nonionic and/or cationic emulsifying agents are preferably used. When the monomers are not completely compatible, a compatibilizer which sufficiently renders these monomers compatible, for example, a water-soluble organic solvent or a low molecular weight monomer, is preferably added. The addition of the compatibilizer can improve emulsifiability and copolymerizability.

The water-soluble organic solvent includes, for example, acetone, methyl ethyl ketone, ethyl acetate, propylene glycol, dipropylene glycol monomethyl ether, dipropylene glycol, tripropylene glycol, and ethanol. The water-soluble organic solvent may be used in the range of 1 to 50 parts by weight, for example, 10 to 40 parts by weight, based on 100 parts by weight of water. Moreover, the low molecular weight monomer includes, for example, methyl methacrylate, glycidyl methacrylate, and 2,2,2-trifluoroethyl methacrylate. The low molecular weight monomer may be used in the range of 1 to 50 parts by weight, for example, 10 to 40 parts by weight, based on 100 parts by weight of the total amount of the monomers.

A chain transfer agent may be used in the polymerization. The molecular weight of the polymer can be changed according to the amount of the chain transfer agent used. The chain transfer agent is, for example, mercaptan group-containing compounds, such as lauryl mercaptan, thioglycol, thioglycerol (particularly alkyl mercaptan (for example, with 1 to 40 carbon atoms)), and inorganic salts, such as sodium hypophosphite and sodium bisulfite. The amount of the chain transfer agent for use may be in the range of 0.01 to 10 parts by weight, for example, 0.1 to 5 parts by weight, based on 100 parts by weight of the total amount of the monomers.

The softening agent composition (treatment agent) may be in the form of a solution, an emulsion or an aerosol. The softening agent composition is preferably an aqueous dispersion. The softening agent composition comprises the silicone polymer, the water-repellent polymer (the active ingredient of the softening agent composition) and the medium (particularly a liquid medium, for example, an organic solvent and/or water). The amount of the medium may be, for example, 5 to 99.9% by weight, particularly 10 to 80% by weight, based on the treatment agent.

The total concentration of the silicone polymer and the water-repellent polymer in the treatment agent may be 0.01 to 95% by weight, 0.1 to 60% by weight, for example, 5 to 50% by weight.

The softening agent composition can be applied to a substrate to be treated by a conventionally known method. Usually, there can be used a method for dispersing and diluting the treatment agent in an organic solvent or water, adhering it to the surface of the substrate to be treated by known procedures, such as dip coating, spray coating, and foam coating, followed by drying. Moreover, if necessary, for example, curing may be carried out together with a suitable cross-linking agent (for example, a blocked isocyanate). Further, it is also possible to add an insect repellent, a softening agent, an antibacterial agent and a flame retarder, an antistatic agent, a paint fixing agent, and a wrinkle-resistant agent, to the treatment agent of the present disclosure and combine them for use. The total concentration of the silicone polymer and the water-repellent polymer in the treatment liquid contacted with the substrate may be 0.01 to 10% by weight (particularly in the case of dip coating), for example, 0.05 to 10% by weight.

The substrate to be treated with the softening agent composition (treatment agent) includes a textile product, masonry, a filter (for example, an electrostatic filter), a dust protective mask, a part of fuel cell (for example, a gaseous diffusion electrode and a gaseous diffusion support), glass, paper, wood, leather, fur, asbestos, brick, cement, metal and oxide, ceramics, plastics, a coated surface, and a plaster. Examples of the textile product include animal and vegetable natural fibers, such as cotton, hemp, wool and silk, synthetic fibers, such as polyamide, polyester, polyvinyl alcohol, polyacrylonitrile, polyvinyl chloride and polypropylene, semi-synthetic fibers, such as rayon and acetate, glass fibers, carbon fibers, inorganic fibers, such as asbestos fibers, or mixed fibers thereof.

The textile product may be in any form, such as fibers or fabric.

The softening agent composition (or the silicone polymer and the water-repellent polymer) can be applied to fibrous substrates (for example, textile products) by any known method to treat textile products in liquid. When the textile product is fabric, the fabric may be immersed in the treatment agent, or the treatment agent may be adhered or sprayed to the fabric. The treated textile product is dried and preferably heated at, for example, 100° C. to 200° C. in order to exhibit oil repellency.

Alternatively, the softening agent composition may be applied to textile products by a cleaning process, and may be applied to textile products via, for example, in a laundry application or dry cleaning process.

The textile products to be treated are typically fabrics, which include woven fabrics, knitted fabrics, nonwoven fabrics, and fabrics in the form of clothing and carpets, but these may be, for example, fibers or yarns or intermediate fiber products (for example, slivers or blister yarns). The textile product materials may be, for example, natural fibers (for example, cotton or wool), chemical fibers (for example, viscose rayon or lyocell), or synthetic fibers (for example, polyester, polyamide or acrylic fibers), or a mixture of fibers (for example, a mixture of natural and synthetic fibers). The softening agent composition is particularly effective in rendering cellulosic fibers (for example, cotton or rayon) oleophobic and oil repellent. Moreover, the methods of the present disclosure generally render the textile products hydrophobic and water repellent.

Alternatively, the fibrous substrate may be a leather. In order to render the leather oleophobic and oil repellent, the softening agent composition may be applied to leather from aqueous solution or aqueous emulsion at various stages of leather processing, for example during leather wet end processing or during leather finishing.

Alternatively, the fibrous substrate may be paper. The softening agent composition may be applied to preformed paper or at various stages of papermaking, for example during drying of the paper.

The softening agent composition can impart oil repellency to the substrate to be treated. The improvement in oil repellency is remarkable when the softening agent composition is used together with the water-repellent fluorine-containing polymer.

The term "treatment" means that the treatment agent is applied to the substrate by, for example, immersion, spray or coating. The treatment gives the result that the polymer which is an active component of the treatment agent is penetrated into internal parts of the substrate and/or adhered to surfaces of the substrate.

EXAMPLES

The present disclosure will be described in more detail below by way to Examples, but the present disclosure is not limited to these Examples.

Parts or % or ratios denote parts by weight or % by weight or ratios by weight, respectively unless otherwise specified below.

The test procedures are as follows.
Shower Water Repellency Test

The shower water repellency test was carried out according to JIS-L-1092. The shower water repellency test was expressed by water repellency No. (as shown in the below-described Table 1).

A glass funnel which has a volume of at least 250 ml and a spray nozzle which can spray 250 ml of water for 20 to 30 seconds are used. A test piece frame is a metal frame having a diameter of 15 cm. Three sheets of a test piece having a size of about 20 cm×20 cm are prepared, and the sheet is mounted on a test piece holding frame so that the sheet has no wrinkle. The center of the spray is located in the center of the sheet. Room temperature water (250 mL) is charged into the glass funnel and sprayed onto the test piece sheet (over a period of 25 to 30 seconds). The holding frame is removed from a stand, one edge of the holding frame is grasped so that a front surface is downside, and the other edge is lightly tapped with a stiff substance. The holding frame is rotated further 180° and the same procedure is repeated to drop excess water droplets. The wet test piece is compared with a wet comparison standard to grade 0, 50, 70, 80, 90 and 100 points in order of poor water repellency to excellent water repellency. The results are obtained from the average of three measurements.

TABLE 1

| Water-repellency No. | State |
| --- | --- |
| 100 | No wetting or water drop adhesion on front surface |
| 90 | No wetting of front surface but adhesion of small water droplets |
| 80 | Wetting in form of small individual water drops of water on front surface |
| 70 | Wetting of half of front surface and state of small individual wetting penetrating fabric |
| 50 | Wetting of whole front surface |
| 0 | Wetting of whole front surface and back surface |

Oil Repellency Test

The treated test fabrics are stored in a constant temperature and humidity chamber at a temperature of 21° C. and a humidity of 65% for 4 hours or longer. The test solution (shown in Table 2) stored at a temperature of 21° C. is used. The test is carried out in the constant temperature and humidity chamber at a temperature of 21° C. and a humidity of 65%. 0.05 ml of the test solution is gently dropped onto the test fabrics each and the solution was left as it was for 30 seconds, and then, if the droplet remains on the test fabric, the test solution is evaluated as acceptable. The oil repellency is evaluated for the highest score of the accepted test solution with 9-stage scores of Fail, 1, 2, 3, 4, 5, 6, 7 and 8 from a poor oil repellency to a good level.

TABLE 2

Oil repellency test solution

| Score | Test solution | Surface tension (dyne/cm, 25° C.) |
|---|---|---|
| 8 | n-Heptane | 20.0 |
| 7 | n-Octane | 21.8 |
| 6 | n-Decan | 23.5 |
| 5 | n-Dodecane | 25.0 |
| 4 | n-Tetradecane | 26.7 |
| 3 | n-Hexadecane | 27.3 |
| 2 | Mixture of n-hexadecane 35/Nujor 65 | 29.6 |
| 1 | Nujor | 31.2 |
| Fail | Inferior to 1 | — |

Feeling

The treated PET fabrics were evaluated by hand touch and difference of feeling was ranked according to the following criteria. At the case of middle between the ranks, 0.5 points are added as the middle rank.

5: Remarkably softer than untreated fabric
4: Slightly or softer than untreated fabric
3: Same as untreated fabric
2: Slightly stiffer than untreated fabric
1: Remarkably stiffer than untreated fabric Example 1

In a 500 ml reaction flask, 19.7 g of $CF_3CF_2$—$(CF_2CF_2)_n$—$CH_2CH_2OCOC(Cl)$=$CH_2$ (n=2.0), 23.4 g of stearyl acrylate, 0.4 g of 2-chloroethyl methacrylate, 194 g of pure water, 34.1 g of water-soluble glycol solvent, 5.7 g of alkyltrimethylammonium chloride, 7.0 g of polyoxyethylene alkyl ether, and 59.0 g of long-chain alkyl silicone (alkylated silicone wax, melting point of 54° C., long-chain alkyl group ($C_{22}$ alkyl group) content of 60%, molecular weight of 8,000), were charged, and the mixture was emulsified and dispersed by supersonic wave while stirred at 60° C. for 15 minutes. After replacing the inside of the reaction flask with nitrogen, a solution of 0.4 g of an azo group-containing water-soluble initiator and 9 g of water was added and reacted at 60° C. for 20 hours to obtain an aqueous dispersion of a polymer (Softening Agent 1). The compositional features of the polymer were almost the same as those of the monomers charged.

Example 2

In a 500 ml reaction flask, 19.7 g of $CF_3CF_2$—$(CF_2CF_2)_n$—$CH_2CH_2OCOC(Cl)$=$CH_2$ (n=2.0), 23.4 g of stearyl acrylate, 0.4 g of 2-chloroethyl methacrylate, 194 g of pure water 194 g, 34.1 g of water-soluble glycol solvent, 5.7 g of alkyltrimethylammonium chloride, 7.0 g of polyoxyethylene alkyl ether, and 59.0 g of epoxy silicone (epoxide group functional group equivalent of 530 g/mol, viscosity of 50 $mm^2$/s (25° C.), molecular weight of 10,000), were charged and the mixture was emulsified and dispersed by supersonic wave while stirred at 60° C. for 15 minutes. After replacing the inside of the reaction flask with nitrogen, a solution of 0.4 g of an azo group-containing water-soluble initiator and 9 g of water was added, and reacted at 60° C. for 20 hours to obtain an aqueous dispersion (Softening Agent 2) of a polymer. The compositional features of the polymer were almost the same as those of the monomers charged.

Example 3

In a 500 ml reaction flask, 19.7 g of $CF_3CF_2$—$(CF_2CF_2)_n$—$CH_2CH_2OCOC(Cl)$=$CH_2$ (n=2.0), 23.4 g of stearyl acrylate, 0.4 g of 2-chloroethyl methacrylate, 194 g of pure water, 34.1 g of water-soluble glycol solvent, 5.7 g of alkyltrimethylammonium chloride, 7.0 g of polyoxyethylene alkyl ether, and 59.0 g of vinyl silicone (vinyl group content of 1.33 mol %, viscosity of 500 $mm^2$/s, molecular weight of 12,000), were charged and the mixture was emulsified and dispersed by supersonic wave while stirred at 60° C. for 15 minutes. After replacing the inside of the reaction flask with nitrogen, a solution of 0.4 g of an azo group-containing water-soluble initiator and 9 g of water was added and reacted at 60° C. for 20 hours to obtain an aqueous dispersion of a polymer (Softening Agent 3). The compositional features of the polymer were almost the same as those of the monomers charged.

Example 4

In a 500 ml reaction flask, 43.2 g of stearyl acrylate, 240 g of pure water, 27.0 g of tripropylene glycol, 4.0 g of dimethylaminopropylamide stearate, 7.0 g of polyoxyethylene isotridecyl ether, 0.23 g of acetic acid, 72 g of long-chain alkyl silicone (alkylated silicone wax, melting point of 47° C., long-chain alkyl group ($C_{22}$ alkyl group) content of 60%, molecular weight of 8,000), were charged and the mixture was emulsified and dispersed while stirred at 60° C. for 15 minutes. After replacing the inside of the reaction flask with nitrogen, a solution of 0.24 g of lauryl mercaptan, 0.48 g of 2,2-azobis(2-amidinopropane) dihydrochloride (hereinafter referred to as V-50) and 9 g of water was added, and reacted at 60° C. for 5 hours to obtain an aqueous dispersion of a polymer (Softening Agent 4). The compositional features of the polymer were almost the same as those of the monomers charged.

Reference Example 1

In a 500 ml reaction flask, 46.1 g of $CF_3CF_2$—$(CF_2CF_2)_n$—$CH_2CH_2OCOC(Cl)$=$CH_2$ (n=2.0), 56.2 g of stearyl acrylate, 2.0 g of 2-chloroethyl methacrylate, 194 g of pure water, 34.1 g of water-soluble glycol solvent, 5.7 g of alkyltrimethylammonium chloride, and 7.0 g of polyoxyethylene alkyl ether were charged, and the mixture was emulsified and dispersed by supersonic wave while stirred at 60° C. for 15 minutes. After replacing the inside of the reaction flask with nitrogen, a solution of 0.4 g of an azo group-containing water-soluble initiator and 9 g of water was added and reacted at 60° C. for 20 hours to obtain an aqueous dispersion of a polymer (Water-repellent Agent 1). The compositional features of the polymer were almost the same as those of the monomers charged.

Reference Example 2

In a 500 ml reaction flask, 115.2 g of stearyl acrylate, 240 g of pure water, 27.0 g of tripropylene glycol, 4.0 g of dimethylaminopropylamide stearate, 7.0 g of polyoxyethylene isotridecyl ether, and 0.23 g of acetic acid were charged, and the mixture was emulsified and dispersed by supersonic wave while stirred at 60° C. for 15 minutes. After replacing the inside of the reaction flask with nitrogen, a solution of 0.24 g of lauryl mercaptan, 0.48 g of 2,2-azobis(2-amidinopropane) dihydrochloride (hereinafter referred to as V-50) and 9 g of water was added, and reacted at 60° C. for 5 hours to obtain an aqueous dispersion of a polymer (Water-repellent Agent 2). The compositional features of the polymer were almost the same as those of the monomers charged.

Test Example 1

Water-repellent Agent 1 produced in Reference Example 1 was added to water, and then Softening Agent 1 produced in Example 1 was added to obtain a treatment liquid having a water-repellent agent active ingredient concentration (polymer concentration of the water-repellent agent) of 2% and a softening agent active ingredient concentration (total concentration of the polymer and silicone of the softening agent) of 2%. PET fabric, cotton fabric, and nylon fabric (500 mm×200 mm) were continuously immersed in this treatment liquid, passed through a mangle, and treated with a pin tenter at 170° C. for 1 minute. Subsequently, they were subjected to the water repellency test. The results are shown in Table 3.

Test Example 2

Water-repellent Agent 1 produced in Reference Example 1 was added to water, and then Softening Agent 2 produced in Example 2 was added to obtain a treatment liquid having a water-repellent agent active ingredient concentration (polymer concentration of the water-repellent agent) of 2% and a softening agent active ingredient concentration (total concentration of the polymer and silicone of the softening agent) of 2%. PET fabric, cotton fabric, and nylon fabric (500 mm×200 mm) were continuously immersed in this treatment liquid, passed through a mangle, and treated with a pin tenter at 170° C. for 1 minute. Subsequently, they were subjected to the water repellency test. The results are shown in Table 3.

Test Example 3

Water-repellent Agent 1 produced in Reference Example 1 was added to water, and then Softening Agent 3 produced in Example 3 was added to obtain a treatment liquid having a water-repellent agent active ingredient concentration (polymer concentration of the water-repellent agent) of 2% and a softening agent active ingredient concentration (total concentration of the polymer and silicone of the softening agent) of 2%. PET fabric, cotton fabric, and nylon fabric (500 mm×200 mm) were continuously immersed in this treatment liquid, passed through a mangle, and treated with a pin tenter at 170° C. for 1 minute. Subsequently, they were subjected to the water repellency test. The results are shown in Table 3.

Test Example 4

Water-repellent Agent 2 produced in Reference Example 2 was added to water, and then Softening Agent 4 produced in Example 4 was added to obtain a treatment liquid having a water-repellent agent active ingredient concentration (polymer concentration of the water-repellent agent) of 4% and a softening agent active ingredient concentration (total concentration of the polymer and silicone of the softening agent) of 2%. PET fabric, cotton fabric, and nylon fabric (500 mm×200 mm) were continuously immersed in this treatment liquid, passed through a mangle, and treated with a pin tenter at 170° C. for 1 minute. Subsequently, they were subjected to the water repellency test. The results are shown in Table 3.

Test Example 5

Water-repellent Agent 2 produced in Reference Example 2 was added to water, and then Softening Agent 4 produced in Example 4 was added to obtain a treatment liquid having a water-repellent agent active ingredient concentration (polymer concentration of the water-repellent agent) of 2% and a softening agent active ingredient concentration (total concentration of the polymer and silicone of the softening agent) of 2%. PET fabric, cotton fabric, and nylon fabric (500 mm×200 mm) were continuously immersed in this treatment liquid, passed through a mangle, and treated with a pin tenter at 170° C. for 1 minute. Subsequently, they were subjected to a water repellency test. The results are shown in Table 3.

Comparative Test Example 1

Water-repellent Agent 1 produced in Reference Example 1 was added to water to obtain a treatment liquid having a water-repellent agent active ingredient concentration (polymer concentration of the water-repellent agent) of 4%. PET fabric, cotton fabric, and nylon fabric (500 mm×200 mm) were continuously immersed in this treatment liquid, passed through a mangle, and treated with a pin tenter at 170° C. for 1 minute. Subsequently, they were subjected to the water repellency test. The results are shown in Table 3.

Comparative Test Example 2

Water-repellent Agent 1 produced in Reference Example 1 was added to water, and then a commercially available silicone softening agent (aminosilicone emulsion; weakly cationic, solid content of 14%, and aminosilicone molecular weight of 20,000) was added to obtain a treatment liquid having a water-repellent agent active ingredient concentration (polymer concentration of the water-repellent agent) of 4% and a softening agent active ingredient concentration (silicone concentration of the softening agent) of 2%. PET fabric, cotton fabric, and nylon fabric (500 mm×200 mm) were continuously immersed in this treatment liquid, passed through a mangle, and treated with a pin tenter at 170° C. for 1 minute. Subsequently, they were subjected to the water repellency test. The results are shown in Table 3.

Comparative Test Example 3

Water-repellent Agent 1 produced in Reference Example 1 was added to water, and then a commercially available silicone softening agent (aminosilicone emulsion; weakly cationic, solid content of 14%, and aminosilicone molecular weight of 20,000) was added to obtain a treatment liquid having a water-repellent agent active ingredient concentration (polymer concentration of the water-repellent agent) of 2% and a softening agent active ingredient concentration (silicone concentration of the softening agent) of 2%. PET fabric, cotton fabric, and nylon fabric (500 mm×200 mm)

were continuously immersed in this treatment liquid, passed through a mangle, and treated with a pin tenter at 170° C. for 1 minute. Subsequently, they were subjected to the water repellency test. The results are shown in Table 3.

Comparative Test Example 4

Water-repellent Agent 2 produced in Reference Example 2 was added to water to obtain a treatment liquid having a water-repellent agent active ingredient concentration (polymer concentration of the water-repellent agent) of 4%. PET fabric, cotton fabric, and nylon fabric (500 mm×200 mm) were continuously immersed in this treatment liquid, passed through a mangle, and treated with a pin tenter at 170° C. for 1 minute. Subsequently, they were subjected to the water repellency test. The results are shown in Table 3.

Comparative Test Example 5

Water-repellent Agent 2 produced in Reference Example 2 was added to water, and then a commercially available silicone softening agent (aminosilicone emulsion; weakly cationic, solid content of 14%, and aminosilicone molecular weight of 20,000) was added to obtain a treatment liquid having a water-repellent agent active ingredient concentration (polymer concentration of the water-repellent agent) of 4% and a softening agent active ingredient concentration (silicone concentration of the softening agent) of 2%. PET fabric, cotton fabric, and nylon fabric (500 mm×200 mm) were continuously immersed in this treatment liquid, passed through a mangle, and treated with a pin tenter at 170° C. for 1 minute. Subsequently, they were subjected to the water repellency test. The results are shown in Table 3.

Comparative Test Example 6

Water-repellent Agent 2 produced in Reference Example 2 was added to water, and then a commercially available silicone softening agent (aminosilicone emulsion; weakly cationic, solid content of 14%, and aminosilicone molecular weight of 20,000) was added to obtain a treatment liquid having a water-repellent agent active ingredient concentration (polymer concentration of the water-repellent agent) of 2% and a softening agent active ingredient concentration (silicone concentration of the softening agent) of 2%. PET fabric, cotton fabric, and nylon fabric (500 mm×200 mm) were continuously immersed in this treatment liquid, passed through a mangle, and treated with a pin tenter at 170° C. for 1 minute. Subsequently, they were subjected to the water repellency test. The results are shown in Table 3.

TABLE 3

| Test Ex. No. | | 1 | 2 | 3 | 4 | 5 | Com. 1 |
|---|---|---|---|---|---|---|---|
| Water-repellent agent | Type | Fluorine-containing | Fluorine-containing | Fluorine-containing | Fluorine-free | Fluorine-free | Fluorine-containing |
| | Concentration | 2% | 2% | 2% | 4% | 2% | 4% |
| Softening agent | Commercial product Concentration | | | | | | |
| | Ex. 1 Concentration | 2% | | | | | |
| | Ex. 2 Concentration | | 2% | | | | |
| | Ex. 3 Concentration | | | 2% | | | |
| | Ex. 4 Concentration | | | | 2% | 2% | |
| PET fabric | Water repellency | 100 | 100 | 100 | 100 | 80 | 100 |
| | Oil repellency | 2 | 3 | 3 | Fail | Fail | 2 |
| | Feeling | 2.5 | 2.5 | 2.5 | 2 | 3 | 1.5 |
| Cotton fabric | Water repellency | 100 | 95 | 100 | 100 | 90 | 100 |
| | Oil repellency | 4 | 5 | 4 | Fail | Fail | 4 |
| | Feeling | 2 | 1.5 | 2 | 2.5 | 2.5 | 1.5 |
| Nylon fabric | Water repellency | 100 | 100 | 95 | 90 | 90 | 90+ |
| | Oil repellency | 5 | 4 | 5 | Fail | Fail | 4 |
| | Feeling | 3.5 | 4 | 3.5 | 3.5 | 4 | 3 |

| Test Ex. No. | | Com. 2 | Com. 3 | Com. 4 | Com. 5 | Com. 6 |
|---|---|---|---|---|---|---|
| Water-repellent agent | Type | Fluorine-containing | Fluorine-containing | Fluorine-free | Fluorine-free | Fluorine-free |
| | Concentration | 4% | 2% | 4% | 4% | 2% |
| Softening agent | Commercial product Concentration | 2% | 2% | | 2% | 2% |
| | Ex. 1 Concentration | | | | | |
| | Ex. 2 Concentration | | | | | |
| | Ex. 3 Concentration | | | | | |
| | Ex. 4 Concentration | | | | | |
| PET fabric | Water repellency | 80 | 70 | 100 | 75 | 70 |
| | Oil repellency | 1 | Fail | Fail | Fail | Fail |
| | Feeling | 2.5 | 3 | 1.5 | 2.5 | 3 |
| Cotton fabric | Water repellency | 90 | 80 | 90 | 75 | 50 |
| | Oil repellency | 3 | 2 | Fail | Fail | Fail |
| | Feeling | 2 | 2 | 2 | 2.5 | 2.5 |
| Nylon fabric | Water repellency | 80 | 70 | 90 | 80 | 60 |
| | Oil repellency | 2 | 1 | Fail | Fail | Fail |
| | Feeling | 3.5 | 4 | 3 | 3.5 | 3.5 |

INDUSTRIAL APPLICABILITY

The softening agent composition of the present disclosure can be used as a softening agent imparting softness and water repellency to substrates.

What is claimed is:

1. A softening agent composition, comprising
(1) a silicone polymer,
(2) at least one water-repellent polymer which is polymerized in the presence of the silicone polymer, and selected from the group consisting of a fluorine-containing polymer and a fluorine-free polymer,
(3) a liquid medium which is water or a mixture of water and an organic solvent, and
(4) an emulsifier,
wherein an amount of the silicone polymer is 20% by weight or more, based on a total amount of the silicone polymer and the water-repellent polymer;
wherein the silicone polymer (1) is a polymer represented by the formula:

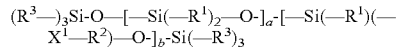

wherein $R^1$ each is independently a hydrogen atom, an alkyl group having 1 to 20 carbon atoms, an aryl group having 6 to 20 carbon atoms, or an alkoxy group having 1 to 4 carbon atoms,
$R^2$ each is independently a functional group,
$R^3$ each is independently a hydrogen atom, an alkyl group having 1 to 20 carbon atoms, an aryl group having 6 to 20 carbon atoms, or an alkoxy group having 1 to 4 carbon atoms,
$X^1$ each is a direct bond or a divalent hydrocarbon group having 1 to 10 carbon atoms,
a is an integer of 0 or larger, b is an integer of 0 or larger, and (a+b) is 5 to 200, and
wherein the functional group is at least one functional group selected from the group consisting of an epoxy group, an amino group, a vinyl group, a (meth)acrylamide group, a (meth)acrylate group and a hydrocarbon group having 7 to 40 carbon atoms; and
wherein the water-repellent polymer (2) further comprises a repeating unit formed from a fluorine-free non-crosslinkable monomer and/or a fluorine-free crosslinkable monomer.

2. The softening agent composition according to claim 1, wherein the fluorine-containing polymer is a fluorine-containing polymer having a repeating unit derived from a fluorine-containing monomer represented by the formula:

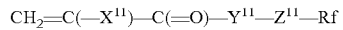

wherein $X^{11}$ is a hydrogen atom, a linear or branched alkyl group having 1 to 21 carbon atoms, a fluorine atom, a chlorine atom, a bromine atom, an iodine atom, and a $CFX^1X^2$ group ($X^1$ and $X^2$ are a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group, and a substituted or unsubstituted phenyl group;
$Y^{11}$ is —O— or —NH—;
$Z^{11}$ is a direct bond,
a linear or branched aliphatic group having 1 to 20 carbon atoms,
an aromatic group or cycloaliphatic group having 6 to 30 carbon atoms, a group represented by the formula: —$R^2(R^1)N$—$SO_2$— or the formula: —$R^2(R^1)N$—CO—, wherein $R^1$ is an alkyl group having 1 to 10 carbon atoms, and $R^2$ is a linear alkylene group or branched alkylene group having 1 to 10 carbon atoms,
a group represented by the formula: —$CH_2CH(OR^3)$ $CH_2$—(Ar—O)$_p$—, wherein $R^3$ is a hydrogen atom or an acyl group having 1 to 10 carbon atoms, Ar is an arylene group optionally having a substituent, and p represents 0 or 1,
a group represented by the formula: —$CH_2$—Ar—(O)$_q$—, wherein Ar is an arylene group optionally having a substituent, and q is 0 or 1, or
a —$(CH_2)_m$—$SO_2$—$(CH_2)_n$— group or a —$(CH_2)_m$—S—$(CH_2)_n$— group, wherein m is 1 to 10 and n is 0 to 10; and
Rf is a linear or branched fluoroalkyl group having 1 to 20 carbon atoms, and
the fluorine-free polymer is a fluorine-free polymer having a repeating unit derived from a long-chain (meth) acrylic monomer represented by the formula:

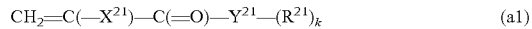

wherein $R^{21}$ is a hydrocarbon group having 7 to 40 carbon atoms,
$X^{21}$ is a hydrogen atom, a methyl group or a halogen atom,
$Y^{21}$ is a group other than a hydrocarbon group and is composed of at least one group selected from the group consisting of a divalent to tetravalent hydrocarbon group having 1 carbon atom (particularly —$CH_2$— or —CH=), —$C_6H_4$—, —O—, —C(=O)—, —S(=O)$_2$— and —NH—, and
k is 1 to 3.

3. The softening agent composition according to claim 2, wherein in the fluorine-containing monomer, $X^{11}$ is a hydrogen atom, a methyl group or a chlorine atom, and Rf has 1 to 6 carbon atoms.

4. The softening agent composition according to claim 2, wherein in the long-chain (meth)acrylic monomer, $Y^{21}$ is —O—, —NH—, —O—C(=O)—, —C(=O)—NH—, —NH—C(=O)—, —O—C(=O)—NH—, —NH—C(=O)—O—, —NH—C(=O)—NH—, —O—$C_6H_4$—, —O—$(CH_2)_m$—O—, —NH—$(CH_2)_m$—NH—, —O—$(CH_2)_m$—NH—, —NH—$(CH_2)_m$—O—, —O—$(CH_2)_m$—O—C(=O)—, —O—$(CH_2)_m$—C(=O)—O—, —NH—$(CH_2)_m$—O—C(=O)—, —NH—$(CH_2)_m$—C(=O)—O—, —O—$(CH_2)_m$—O—C(=O)—NH—, —O—$(CH_2)_m$—NH—C(=O)—O—, —O—$(CH_2)_m$—C(=O)—NH—, —O—$(CH_2)_m$—NH—C(=O)—, —O—$(CH_2)_m$—NH—C(=O)—NH—, —O—$(CH_2)_m$—O—$C_6H_4$—, —O—$(CH_2)_m$—NH—S(=O)$_2$—, —O—$(CH_2)_m$—S(=O)$_2$—NH—, —NH—$(CH_2)_m$—O—C(=O)—NH—, —NH—$(CH_2)_m$—NH—C(=O)—O—, —NH—$(CH_2)_m$—C(=O)—NH—, —NH—$(CH_2)_m$—NH—C(=O)—, —NH—$(CH_2)_m$—NH—C(=O)—NH—, —NH—$(CH_2)_m$—O—$C_6H_4$—, —NH—$(CH_2)_m$—NH—$C_6H_4$—, —NH—$(CH_2)_m$—NH—S(=O)$_2$—, or —NH—$(CH_2)_m$—S(=O)$_2$—NH—, wherein m is 1 to 5.

5. The softening agent composition according to claim 1, wherein an amount of the silicone polymer (1) is 30 to 90% by weight, based on a total weight of the silicone polymer (1) and the water-repellent polymer (2),
an amount of the liquid medium (3) is 5 to 99.9% by weight, based on the softening agent composition, and an amount of the emulsifier (4) is 0.1 to 20 parts by weight, based on 100 parts by weight of a total amount of the silicone polymer (1) and the water-repellent polymer (2).

6. The softening agent composition according to claim 1, wherein the fluorine-free non-crosslinkable monomer is,
in the fluorine-containing polymer, a long-chain (meth) acrylic monomer represented by the formula:

$$CH_2=CA^{21}-C(=O)-Y^{21}-A^{22}$$

wherein $A^{21}$ is a hydrogen atom or a methyl group,
$A^{22}$ is a linear or branched aliphatic hydrocarbon group having 7 to 40 carbon atoms, and
$Y^{21}$ is —O— or —NH—, or
in the fluorine-containing polymer or the fluorine-free polymer, a cyclic hydrocarbon group-containing (meth) acrylic monomer represented by the formula:

$$CH_2=CA^{31}-C(=O)-Y^{31}-A^{32}$$

wherein $A^{31}$ is a hydrogen atom or a methyl group,
$A^{32}$ is a cyclic hydrocarbon group having 4 to 20 carbon atoms, and
$Y^{31}$ is —O— or —NH—.

7. The softening agent composition according to claim 1, wherein the fluorine-free crosslinkable monomer is a compound having at least two ethylenically unsaturated double bonds, or a compound having at least one ethylenically unsaturated double bond and at least one reactive group, and the reactive group is at least one selected from the group consisting of a hydroxyl group, an epoxy group, a chloromethyl group, a blocked isocyanate group, an amino group and a carboxyl group.

8. The softening agent composition according to claim 1, wherein in the water-repellent polymer (2),
a total amount of the fluorine-containing monomer and the long-chain hydrocarbon group-containing fluorine-free monomer is 32 to 98% by weight, based on the water-repellent polymer,
an amount of the fluorine-free non-crosslinkable monomer is 2 to 68% by weight, based on the water-repellent polymer, and
an amount of the fluorine-free crosslinkable monomer is 0.1 to 20 parts by weight, based on 100 parts by weight of a total amount of the fluorine-containing monomer and the long-chain hydrocarbon group-containing fluorine-free monomer.

9. A method for producing the softening agent composition according to claim 1, comprising:
producing a water-repellent polymer (2) by polymerizing a monomer constituting the water-repellent polymer (2) in the presence of a silicone polymer (1), to obtain the softening agent composition.

10. A method for treating a substrate, comprising treatment with the softening agent composition according to claim 1.

11. A substrate treated with the softening agent composition according to claim 1.

12. A softening agent composition, comprising
(1) a silicone polymer,
(2) at least one water-repellent polymer which is polymerized in the presence of the silicone polymer, and selected from the group consisting of a fluorine-containing polymer and a fluorine-free polymer,
(3) a liquid medium which is water or a mixture of water and an organic solvent, and
(4) an emulsifier, wherein an amount of the silicone polymer is 20% by weight or more, based on a total amount of the silicone polymer and the water-repellent polymer;
wherein the silicone polymer (1) is a polymer represented by the formula:

$$(R^3-)_3Si-O-[-Si(-R^1)_2-O-]_a-[-Si(-R^1)(-X^1-R^2)-O-]_b-Si(-R^3)_3$$

wherein $R^1$ each is independently a hydrogen atom, an alkyl group having 1 to 20 carbon atoms, an aryl group having 6 to 20 carbon atoms, or an alkoxy group having 1 to 4 carbon atoms,
$R^2$ each is independently a functional group,
$R^3$ each is independently the functional group,
$X^1$ each is a direct bond or a divalent hydrocarbon group having 1 to 10 carbon atoms,
a is an integer of 0 or larger, b is an integer of 0 or larger, and (a+b) is 5 to 200, and
wherein the functional group is at least one functional group selected from the group consisting of an epoxy group, an amino group, a vinyl group, a (meth)acrylamide group, a (meth)acrylate group and a hydrocarbon group having 7 to 40 carbon atoms; and
wherein the water-repellent polymer (2) further comprises a repeating unit formed from a fluorine-free non-crosslinkable monomer and/or a fluorine-free crosslinkable monomer.

13. The softening agent composition according to claim 12, wherein the fluorine-containing polymer is a fluorine-containing polymer having a repeating unit derived from a fluorine-containing monomer represented by the formula:

$$CH_2=C(-X^{11})-C(=O)-Y^{11}-Z^{11}-Rf$$

wherein $X^{11}$ is a hydrogen atom, a linear or branched alkyl group having 1 to 21 carbon atoms, a fluorine atom, a chlorine atom, a bromine atom, an iodine atom, and a $CFX^1X^2$ group ($X^1$ and $X^2$ are a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group, and a substituted or unsubstituted phenyl group;
$Y^{11}$ is —O— or —NH—;
$Z^{11}$ is a direct bond,
a linear or branched aliphatic group having 1 to 20 carbon atoms,
an aromatic group or cycloaliphatic group having 6 to 30 carbon atoms,
a group represented by the formula: —$R^2(R^1)N-SO_2$— or the formula: —$R^2(R^1)N-CO$—, wherein $R^1$ is an alkyl group having 1 to 10 carbon atoms, and $R^2$ is a linear alkylene group or branched alkylene group having 1 to 10 carbon atoms,
a group represented by the formula: —$CH_2CH(OR^3)CH_2-(Ar-O)_p$—, wherein $R^3$ is a hydrogen atom or an acyl group having 1 to 10 carbon atoms, Ar is an arylene group optionally having a substituent, and p represents 0 or 1,
a group represented by the formula: —$CH_2-Ar-(O)_q$—, wherein Ar is an arylene group optionally having a substituent, and q is 0 or 1, or
a —$(CH_2)_m-SO_2-(CH_2)_n$— group or a —$(CH_2)_m-S-(CH_2)_n$— group, wherein m is 1 to 10 and n is 0 to 10; and
Rf is a linear or branched fluoroalkyl group having 1 to 20 carbon atoms, and the fluorine-free polymer is a fluorine-free polymer having a repeating unit derived from a long-chain (meth)acrylic monomer represented by the formula:

$$CH_2=C(-X^{21})-C(=O)-Y^{21}-(R^{21})_k \quad (a1)$$

wherein $R^{21}$ is a hydrocarbon group having 7 to 40 carbon atoms, $X^{21}$ is a hydrogen atom, a methyl group or a halogen atom, $Y^{21}$ is a group other than a hydrocarbon group and is composed of at least one group selected from the group consisting of a divalent to tetravalent hydrocarbon group having 1 carbon atom (particularly —CH$_2$— or —CH=), —C$_6$H$_4$—, —O—, —C(=O)—, —S(=O)$_2$— and —NH—, and k is 1 to 3.

14. The softening agent composition according to claim 13, wherein in the fluorine-containing monomer, $X^{11}$ is a hydrogen atom, a methyl group or a chlorine atom, and Rf has 1 to 6 carbon atoms.

15. The softening agent composition according to claim 13, wherein in the long-chain (meth)acrylic monomer, $Y^{21}$ is —O—, —NH—, —O—C(=O)—, —C(=O)—NH—, —NH—C(=O)—, —O—C(=O)—NH—, —NH—C(=O)—O—, —NH—C(=O)—NH—, —O—C$_6$H$_4$—, —O—(CH$_2$)$_m$—O—, —NH—(CH$_2$)$_m$—NH—, —O—(CH$_2$)$_m$—NH—, —NH—(CH$_2$)$_m$—O—, —O—(CH$_2$)$_m$—O—C(=O)—, —O—(CH$_2$)$_m$—C(=O)—O—, —NH—(CH$_2$)$_m$—O—C(=O)—, —NH—(CH$_2$)$_m$—C(=O)—O—, —O—(CH$_2$)$_m$—O—C(=O)—NH—, —O—(CH$_2$)$_m$—NH—C(=O)—O—, —O—(CH$_2$)$_m$—C(=O)—NH—, —O—(CH$_2$)$_m$—NH—C(=O)—, —O—(CH$_2$)$_m$—NH—C(=O)—NH—, —O—(CH$_2$)$_m$—O—C$_6$H$_4$—, —O—(CH$_2$)$_m$—NH—S(=O)$_2$—, —O—(CH$_2$)$_m$—S(=O)$_2$—NH—, —NH—(CH$_2$)$_m$—O—C(=O)—NH—, —NH—(CH$_2$)$_m$—NH—C(=O)—O—, —NH—(CH$_2$)$_m$—C(=O)—NH—, —NH—(CH$_2$)$_m$—NH—C(=O)—, —NH—(CH$_2$)$_m$—NH—C(=O)—NH—, —NH—(CH$_2$)$_m$—O—C$_6$H$_4$—, —NH—(CH$_2$)$_m$—NH—C$_6$H$_4$—, —NH—(CH$_2$)$_m$—NH—S(=O)$_2$—, or —NH—(CH$_2$)$_m$—S(=O)$_2$—NH—, wherein m is 1 to 5.

16. The softening agent composition according to claim 12,
wherein an amount of the silicone polymer (1) is 30 to 90% by weight, based on a total weight of the silicone polymer (1) and the water-repellent polymer (2),
an amount of the liquid medium (3) is 5 to 99.9% by weight, based on the softening agent composition, and
an amount of the emulsifier (4) is 0.1 to 20 parts by weight, based on 100 parts by weight of a total amount of the silicone polymer (1) and the water-repellent polymer (2).

17. The softening agent composition according to claim 12, wherein the fluorine-free non-crosslinkable monomer is,
in the fluorine-containing polymer, a long-chain (meth)acrylic monomer represented by the formula:

$$CH_2=CA^{21}-C(=O)-Y^{21}-A^{22}$$

wherein $A^{21}$ is a hydrogen atom or a methyl group,
$A^{22}$ is a linear or branched aliphatic hydrocarbon group having 7 to 40 carbon atoms, and
$Y^{21}$ is —O— or —NH—, or
in the fluorine-containing polymer or the fluorine-free polymer, a cyclic hydrocarbon group-containing (meth)acrylic monomer represented by the formula:

$$CH_2=CA^{31}-C(=O)-Y^{31}-A^{32}$$

wherein $A^{31}$ is a hydrogen atom or a methyl group,
$A^{32}$ is a cyclic hydrocarbon group having 4 to 20 carbon atoms, and
$Y^{31}$ is —O— or —NH—.

18. The softening agent composition according to claim 12, wherein the fluorine-free crosslinkable monomer is a compound having at least two ethylenically unsaturated double bonds, or a compound having at least one ethylenically unsaturated double bond and at least one reactive group, and the reactive group is at least one selected from the group consisting of a hydroxyl group, an epoxy group, a chloromethyl group, a blocked isocyanate group, an amino group and a carboxyl group.

19. The softening agent composition according to claim 12,
wherein in the water-repellent polymer (2),
a total amount of the fluorine-containing monomer and the long-chain hydrocarbon group-containing fluorine-free monomer is 32 to 98% by weight, based on the water-repellent polymer,
an amount of the fluorine-free non-crosslinkable monomer is 2 to 68% by weight, based on the water-repellent polymer, and
an amount of the fluorine-free crosslinkable monomer is 0.1 to 20 parts by weight, based on 100 parts by weight of a total amount of the fluorine-containing monomer and the long-chain hydrocarbon group-containing fluorine-free monomer.

20. A substrate treated with the softening agent composition according to claim 12.

* * * * *